US 8,761,460 B2

(12) United States Patent
Ohta

(10) Patent No.: US 8,761,460 B2
(45) Date of Patent: Jun. 24, 2014

(54) METHOD OF AUTOMATICALLY TRACKING AND PHOTOGRAPHING CELESTIAL OBJECTS, AND CELESTIAL-OBJECT AUTO-TRACKING PHOTOGRAPHING APPARATUS

(75) Inventor: Makoto Ohta, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 199 days.

(21) Appl. No.: 13/494,196

(22) Filed: Jun. 12, 2012

(65) Prior Publication Data

US 2012/0321132 A1 Dec. 20, 2012

(30) Foreign Application Priority Data

Jun. 17, 2011 (JP) .................................. 2011-134756

(51) Int. Cl.
*G06K 9/00* (2006.01)
(52) U.S. Cl.
USPC ........................................................ 382/118
(58) Field of Classification Search
None
See application file for complete search history.

(56) References Cited

U.S. PATENT DOCUMENTS

| 6,369,942 | B1 * | 4/2002 | Hedrick et al. ............... 359/430 |
| 6,429,895 | B1 * | 8/2002 | Onuki ....................... 348/208.99 |
| 7,057,645 | B1 | 6/2006 | Hara et al. |
| 2005/0168587 | A1 * | 8/2005 | Sato et al. ................. 348/208.99 |
| 2008/0226276 | A1 * | 9/2008 | Uenaka .......................... 396/55 |
| 2010/0103251 | A1 * | 4/2010 | Numako ........................ 348/61 |
| 2011/0285855 | A1 | 11/2011 | Ohta |
| 2011/0292217 | A1 | 12/2011 | Ohta |
| 2011/0293139 | A1 | 12/2011 | Ohta |

FOREIGN PATENT DOCUMENTS

| JP | 6-130446 | 5/1994 |
| JP | 2000-224470 | 8/2000 |
| JP | 2003-259184 | 9/2003 |
| JP | 2004-201056 | 7/2004 |
| JP | 2007-89087 | 4/2007 |
| JP | 2008-289052 | 11/2008 |
| JP | 2010-122672 | 6/2010 |

OTHER PUBLICATIONS

P.C.T. Office action, dated Jun. 7, 2011 along with an english translation thereof.
P.C.T. Office action, dated Jul. 24, 2012 along with an english translation thereof.

* cited by examiner

*Primary Examiner* — Barry Drennan
*Assistant Examiner* — Oneal R Mistry
(74) *Attorney, Agent, or Firm* — Greenblum & Bernstein, P.L.C.

(57) ABSTRACT

A method of automatically tracking and photographing a celestial object, which moves due to diurnal motion, while moving an imaging area on an imaging surface of an image sensor so that an image of the celestial object becomes stationary, includes calculating theoretical linear movement amounts and a theoretical rotational angle amount of the imaging area per a specified time; obtaining a movable-amount data table which stores data on actual linearly-movable amounts and an actual rotatable amount of the imaging area; and setting an exposure time for completing a celestial-object autotracking photographing operation while moving the imaging area within the range of movement thereof by comparing the theoretical linear movement amounts and the theoretical rotational angle amount with the actual linearly-movable amounts and the actual rotatable amount of the imaging area stored in the movable-amount data table.

16 Claims, 14 Drawing Sheets

← → Movable within This Range

Fig. 3

| Range of Movement in Y-Direction | Range of Movement in X-Direction | | | | | | | |
|---|---|---|---|---|---|---|---|---|
| | -2~-1.5mm | -1.5~-1mm | -1~-0.5mm | -0.5~0mm | 0~0.5mm | 0.5~1mm | 1~1.5mm | 1.5~2mm |
| -2~-1.5mm | -0.3°~0.3° | -0.4°~0.5° | -0.5°~0.8° | -0.5°~1° | -1°~0.5° | -1°~0.5° | -0.8°~0.4° | -0.5°~0.3° |
| -1.5~-1mm | -0.4°~0.5° | -0.5°~0.8° | -1°~1.3° | -1°~1.5° | -1.8°~1.5° | -1.8°~1.5° | -1.3°~1° | -1°~0.5° |
| -1~-0.5mm | -0.5°~1° | -1°~1.3° | -1.5°~1.8° | -1.5°~1.8° | -1.8°~1.8° | -1.8°~1.8° | -1.5°~1.5° | -1°~0.5° |
| -0.5~0mm | -0.8°~1.2° | -1.3°~1.5° | -1.8°~1.8° | -2°~2° | -1.8°~1.8° | -1.8°~1.8° | -1.5°~1.5° | -1°~0.5° |
| 0~0.5mm | -1°~0.5° | -1.5°~1.5° | -1.8°~1.8° | -2°~2° | -2°~2° | -1.8°~1.8° | -1.3°~1.5° | -0.8°~1.2° |
| 0.5~1mm | -1°~0.5° | -1.5°~1.5° | -1.8°~1.5° | -1.8°~1.8° | -1.5°~1.8° | -1.5°~1.8° | -1°~1.3° | -0.5°~1° |
| 1~1.5mm | -0.8°~0.5° | -1.3°~1° | -1.8°~1.5° | -1°~1.5° | -0.5°~1.5° | -0.5°~0.8° | -0.5°~0.8° | -0.4°~0.8° |
| 1.5~2mm | -0.3°~0.3° | -0.5°~0.4° | -1°~0.5° | -1°~0.5° | -0.5°~1° | -0.5°~0.8° | -0.4°~0.5° | -0.3°~0.4° |

Fig.19

| Range of Movement in Y-Direction | Range of Movement in X-Direction | | | | | | | |
|---|---|---|---|---|---|---|---|---|
| | -2~-1.5mm | -1.5~-1mm | -1~-0.5mm | -0.5~0mm | 0~0.5mm | 0.5~1mm | 1~1.5mm | 1.5~2mm |
| -2~-1.5mm | -0.3~-0.4° | -0.4~-0.5° | -0.5~-0.8° | -0.5~1° | -1°~0.5° | -1°~0.5° | -0.5~-0.4° | -0.3~-0.3° |
| -1.5~-1mm | -0.4~-0.8° | -0.5~-0.8° | -1°~-1.3° | -1°~-1.5° | -1.8°~-1.5° | -1.8°~-1.5° | -1°~-1° | -0.8~-0.5° |
| -1~-0.5mm | -0.5°~1° | -1°~-1.3° | -1.5°~-1.8° | -1.8°~-1.8° | -1.8°~-1.8° | -1.8°~-1.8° | -1.5°~-1.5° | -1°~0.5° |
| -0.5~0mm | -0.8°~1.2° | -1.3°~-1.5° | -1.8°~-1.8° | -2°~-2° | -2°~-2° | -1.8°~-1.8° | -1.5°~-1.5° | -1°~0.5° |
| 0~0.5mm | -1°~0.5° | -1.5°~-1.5° | -1.8°~-1.8° | -2°~-2° | -2°~-2° | -1.8°~-1.8° | -1.3°~-1.5° | -0.8~1.2° |
| 0.5~1mm | -1°~0.5° | -1.5°~-1.5° | -1.8°~-1.5° | -1.8°~-1.8° | -1.5°~-1.8° | -1.5°~-1.8° | -1°~-1.3° | -0.5°~1° |
| 1~1.5mm | -1°~0.5° | -1.3°~-1° | -1.3°~-1° | -1°~-1.5° | -1°~-1.5° | -1°~-1.3° | -0.5°~-0.8° | -0.4°~-0.5° |
| 1.5~2mm | -0.5~-0.3° | -0.8~-0.4° | -1°~-0.5° | -1°~-0.5° | -0.5°~1° | -0.5°~-0.8° | -0.4°~-0.5° | -0.3°~0.3° |

METHOD OF AUTOMATICALLY TRACKING AND PHOTOGRAPHING CELESTIAL OBJECTS, AND CELESTIAL-OBJECT AUTO-TRACKING PHOTOGRAPHING APPARATUS

BACKGROUND OF THE INVENTION

1. Field of the Invention

The present invention relates to a method of automatically tracking and photographing celestial objects and a celestial-object auto-tracking photographing apparatus, each of which enables the capture of a freeze-frame picture of a celestial object(s) in long exposure astrophotography.

2. Description of the Related Art

If long exposure astrophotography is carried out with a fixed photographing apparatus, added light of stars during a long exposure form straight or curved light trails in the captured image since celestial objects move relative to the photographing apparatus due to the earth's rotation (diurnal motion).

To carry out a long exposure in order to photograph a celestial object so that the celestial object appears to be still (stationary; a light spot) relative to a photosensitive film or an image sensor (image pickup device) of a photographing apparatus, it is generally the case that a photographing operation (exposure operation) is performed while moving the photographing apparatus relative to the celestial object with use of an equatorial equipped with an auto tracking system. However, an equatorial equipped with an auto tracking system is generally expensive, heavy and difficult to handle; in addition, it is essential to carry out a polar alignment procedure in which the polar axis of the equatorial is brought into alignment with the north celestial pole.

In recent years, celestial-object auto-tracking photography has been proposed in which a photographing apparatus performs a photographing operation (exposure operation) while moving the imaging area of the imaging surface of an image sensor so that the celestial object(s) formed on the imaging surface of the image sensor via a photographing optical system of the photographing apparatus is fixed with respect to the imaging area of the image surface during a long exposure (Japanese Unexamined Patent Publication Nos. 2008-289052 and 2010-122672).

In the above-mentioned Japanese Unexamined Patent Publication No. 2008-289052, an image sensor (imaging area) is moved via a structure capable of rotating the entire movable stage that is capable of moving the image sensor in the X-direction and the Y-direction within a predetermined range of movement.

In Japanese Unexamined Patent Publication No. 2010-122672, an image sensor (imaging area) is moved via a structure capable of linearly moving the image sensor (imaging area) in directions orthogonal to an optical axis of a photographing optical system and rotating the image sensor (imaging area) about an axis parallel to the optical axis of the photographing optical system within a predetermined range of movement.

However, a high-performance CPU is required in order to compute, at a practical speed, information (e.g., information on motion of an image of a celestial object(s) on the imaging area and celestial object tracking information) for moving the imaging area of the imaging surface of an image sensor to thereby control an image of a celestial object(s) so as to become (appear) stationary with respect to the imaging area.

Specifically, to move the imaging area with linear movements (translations) of the imaging area in the X-direction and the Y-direction and rotational movements of the imaging area about an axis parallel to an optical axis of a photographing optical system being combined in such a way as disclosed in the above-mentioned Japanese Unexamined Patent Publication No. 2010-122672, an exposure time needs to be set within a range in which the imaging area does not move beyond the range of movement thereof in consideration of the range of the aforementioned linear movements and the range of the aforementioned rotational movements. This is because, if the imaging area moves beyond the range of movement thereof, tracking photography is no longer possible, which makes the CPU wastefully compute tracking data even on a range beyond an operable exposure time, which results in a further increase in the load on the CPU. In an embodiment utilizing an anti-shake drive unit for a photographing apparatus such as shown in the above-mentioned Japanese Unexamined Patent Publication No. 2010-122672, the range of movement of the imaging area is defined by mechanical limits between the anti-shake drive unit and an associated camera body.

However, the period of time from the commencement of an exposure to the moment the imaging area moves beyond the range of movement thereof varies depending on various factors such as the position of the imaging area at the commencement of the exposure, information on motion (moving direction, moving speed, rotational angle and rotational speed) of a celestial object image on the imaging area, the target celestial object(s), settings on the photographing apparatus, photographing date and time, and photographing location. Accordingly, it is difficult to set an exposure time within a range in which the imaging area does not move beyond the range of movement thereof at all times while such various factors momentarily change. In addition, to obtain a bright and sharp image, it is desirable to set as long exposure time as possible within a range in which the imaging area does not move beyond the range of movement thereof.

SUMMARY OF THE INVENTION

The present invention has been devised based on the awareness of the above described problems and findings, and provides a method of automatically tracking and photographing celestial objects and provides a celestial-object auto-tracking photographing apparatus each of which makes it possible for even a low-powered CPU to set as long exposure time as possible in real time with high precision within a range in which the imaging area does not move beyond the range of movement thereof.

According to an aspect of the present invention, a method of automatically tracking and photographing a celestial object is provided, which moves relative to a photographic apparatus due to diurnal motion, while moving an imaging area on an imaging surface of an image sensor so that an image of the celestial object, which is formed on the imaging surface of the image sensor via a photographing optical system, becomes stationary relative to the imaging area of the imaging surface during a tracking and photographing operation, the method includes calculating, based on information on motion of the celestial object image on the imaging area, theoretical linear movement amounts of the imaging area in directions orthogonal to an optical axis per a specified period of time and a theoretical rotational angle amount of the imaging area about an axis parallel to the optical axis per the specified period of time; obtaining a movable-amount data table which stores data on actual linearly-movable amounts of the imaging area in the directions orthogonal to the optical axis from a reference posture position of the imaging area and an actual rotatable amount of the imaging area about the axis parallel to the optical axis from the reference posture position in a range of movement of the imaging area; and setting an exposure time for completing a celestial-object auto-tracking photographing operation while moving the imaging area within the range of movement thereof by comparing the theoretical linear movement amounts and the theoretical rotational angle amount of the imaging area per the specified period of time with the actual linearly-movable amounts and the actual rotatable amount of the imaging area that are stored in the movable-amount data table, respectively.

The term "imaging area" refers to the entire imaging area of an image sensor (image pickup device) in the case of an embodiment of a photographing apparatus using an anti-shake drive unit. The term "imaging area" denotes a trimmed area (trimmed imaging area) defined by electronically trimming a part of the entire imaging area of an image sensor in the case of an embodiment of a photographing apparatus that utilizes electronic trimming. The term "reference posture position of the imaging area" denotes a position thereof in which the long sides of the rectangular imaging area are positioned horizontally while the center of the rectangular imaging area is coincident with an optical axis of a photographing optical system.

It is desirable for the calculating of the theoretical linear movement amounts and the theoretical rotational angle amount to include calculating the theoretical linear movement amounts and the theoretical rotational angle amount at each step while stepwisely increasing the specified period of time, wherein the setting of the exposure time includes sequentially determining whether or not the theoretical linear movement amounts and the theoretical rotational angle amount at the each step exceed the actual linearly-movable amounts and the actual rotatable amount that are stored in the movable-amount data table, respectively; and setting the exposure time to a shorter time than the specified period of time at a specific step upon determining that at least one of the theoretical linear movement amounts and the theoretical rotational angle amount at the specific step exceeds the actual linearly-movable amounts and the actual rotatable amount, which are stored in the movable-amount data table, respectively.

It is desirable for the setting of the exposure time to include setting the specified period of time at one step before the specific step as the exposure time upon determining that at least one of the theoretical linear movement amounts and the theoretical rotational angle amount at the specific step exceeds the actual linearly-movable amounts and the actual rotatable amount which are stored in the movable-amount data table, respectively.

It is desirable for the method of automatically tracking and photographing a celestial object to include shifting an initial position of the imaging area before commencement of movement thereof in accordance with the theoretical linear movement amounts and the theoretical rotational angle amount of the imaging area per the specified period of time.

It is desirable for the shifting of the initial position of the imaging area to include shifting the initial position of the imaging area before commencement of movement thereof by linear movement amounts and a rotational angle amount in a direction opposite to a direction in the case of the theoretical linear movement amounts and the theoretical rotational angle amount of the imaging area per the specified period of time.

It is desirable for the range of movement of the imaging area in a plane orthogonal to the optical axis to be virtually partitioned and arranged into a matrix with a predetermined number of rows and a predetermined number of columns so that the movable-amount data table stores an actual rotatable amount of the imaging area in each partition in the matrix.

In an embodiment, a celestial-object auto-tracking photographing apparatus is provided, for automatically tracking and photographing a celestial object, which moves relative to the celestial-object auto-tracking photographing apparatus due to diurnal motion, while moving an imaging area on an imaging surface of an image sensor so that an image of the celestial object, which is formed on the imaging surface of the image sensor via a photographing optical system, becomes stationary relative to the imaging area of the imaging surface during a tracking and photographing operation, the celestial-object auto-tracking photographing apparatus including a movement data calculator which calculates, based on information on motion of the celestial object image on the imaging area, theoretical linear movement amounts of the imaging area in directions orthogonal to an optical axis per a specified period of time and a theoretical rotational angle amount of the imaging area about an axis parallel to the optical axis per the specified period of time; a movable-amount data table which stores data on actual linearly-movable amounts of the imaging area in the directions orthogonal to the optical axis from a reference posture position of the imaging area and an actual rotatable amount of the imaging area about the axis parallel to the optical axis from the reference posture position in a range of movement of the imaging area; and an exposure time setter which sets an exposure time for completing a celestial-object auto-tracking photographing operation while moving the imaging area within the range of movement thereof by comparing the theoretical linear movement amounts and the theoretical rotational angle amount of the imaging area per the specified period of time with the actual linearly-movable amounts and the actual rotatable amount of the imaging area that are stored in the movable-amount data table.

It is desirable for the movement data calculator to calculate the theoretical linear movement amounts and the theoretical rotational angle amount at each step while stepwisely increasing the specified period of time, wherein the exposure time setter sequentially determines whether or not the theoretical linear movement amounts and the theoretical rotational angle amount at the each step exceed the actual linearly-movable amounts and the actual rotatable amount, which are stored in the movable-amount data table, respectively, and sets the exposure time to a shorter time than the specified period of time at a specific step upon determining that at least one of the theoretical linear movement amounts and the theoretical rotational angle amount at the specific step exceeds the actual linearly-movable amount and the actual rotatable amount, which are stored in the movable-amount data table, respectively.

It is desirable for the exposure time setter to set the specified period of time at one step before the specific step as the exposure time upon determining that at least one of the theoretical linear movement amounts and the theoretical rotational angle amount at the specific step exceeds the actual linearly-movable amount and the actual rotatable amount, which are stored in the movable-amount data table, respectively.

It is desirable for the celestial-object auto-tracking photographing apparatus to include an imaging area shifter which shifts an initial position of the imaging area before commencement of movement thereof in accordance with the theoretical linear movement amounts and the theoretical rotational angle amount of the imaging area per the specified period of time.

It is desirable for the imaging area shifter to shift the initial position of the imaging area before commencement of movement thereof by linear movement amounts and a rotational angle amount in a direction opposite to a direction of the theoretical linear movement amounts and the theoretical rotational angle amount of the imaging area per the specified period of time.

It is desirable for the range of movement of the imaging area in a plane orthogonal to the optical axis to be virtually partitioned and arranged into a matrix with a predetermined number of rows and a predetermined number of columns, and the movable-amount data table stores an actual rotatable amount of the imaging area in each partition in the matrix.

It is desirable for the imaging area to correspond to an entire imaging area of the image sensor, and wherein the celestial-object auto-tracking photographing apparatus further includes an image sensor mover which linearly moves the image sensor in the directions orthogonal to the optical axis and rotates the image sensor about the axis that is parallel to the optical axis based on the theoretical linear movement amounts and the theoretical rotational angle amount that are calculated by the movement data calculator.

It is desirable for the imaging area to correspond to a trimmed imaging area defined by electronically trimming a part of an entire imaging area of the image sensor, and wherein the celestial-object auto-tracking photographing apparatus further includes an imaging area mover which linearly moves the trimmed imaging area in the directions orthogonal to the optical axis and rotates the trimmed imaging area about the axis that is parallel to the optical axis based on the theoretical linear movement amounts and the theoretical rotational angle amount that are calculated by the movement data calculator.

It is desirable for the imaging area to correspond to a trimmed imaging area defined by electronically trimming a part of an entire imaging area of the image sensor, and wherein the celestial-object auto-tracking photographing apparatus further comprises a mover which moves the celestial object image relative to the celestial-object auto-tracking photographing apparatus by decentering part of the photographing optical system and rotates the trimmed imaging area about the axis that is parallel to the optical axis based on the theoretical linear movement amounts and the theoretical rotational angle amount that are calculated by the movement data calculator. The above-mentioned term "optical axis of the photographing lens" denotes the optical axis of the photographing lens in an initial state before an eccentrical adjustment of the optical axis.

It is desirable for the imaging area to correspond to a trimmed imaging area defined by electronically trimming a part of an entire imaging area of the image sensor, and wherein the celestial-object auto-tracking photographing apparatus further includes a mover which linearly moves the image sensor in the directions orthogonal to the optical axis and rotates the trimmed imaging area about the axis that is parallel to the optical axis based on the theoretical linear movement amounts and the theoretical rotational angle amount that are calculated by the movement data calculator.

According to the present invention, a method of automatically tracking and photographing celestial objects and a celestial-object auto-tracking photographing apparatus, each of which makes it possible for even a low-powered CPU to set as long exposure time as possible in real time with high precision within a range in which the imaging area does not move beyond the range of movement thereof, are achieved.

The present disclosure relates to subject matter contained in Japanese Patent Application No. 2011-134756 (filed on Jun. 17, 2011) which is expressly incorporated herein by reference in its entirety.

BRIEF DESCRIPTION OF THE DRAWINGS

The present invention will be described below in detail with reference to the accompanying drawings in which:

FIG. 3 is a movable-amount data table that shows data of movable amounts of the image sensor;

FIG. 19 is a data table showing data on shift amounts of the initial position of the image sensor.

DESCRIPTION OF THE EMBODIMENTS

An embodiment of a digital camera (photographing apparatus) 10 serving as a celestial-object auto-tracking photographing apparatus according to the present invention will be hereinafter discussed with reference to FIGS. 1 through 19.

Figure 1:
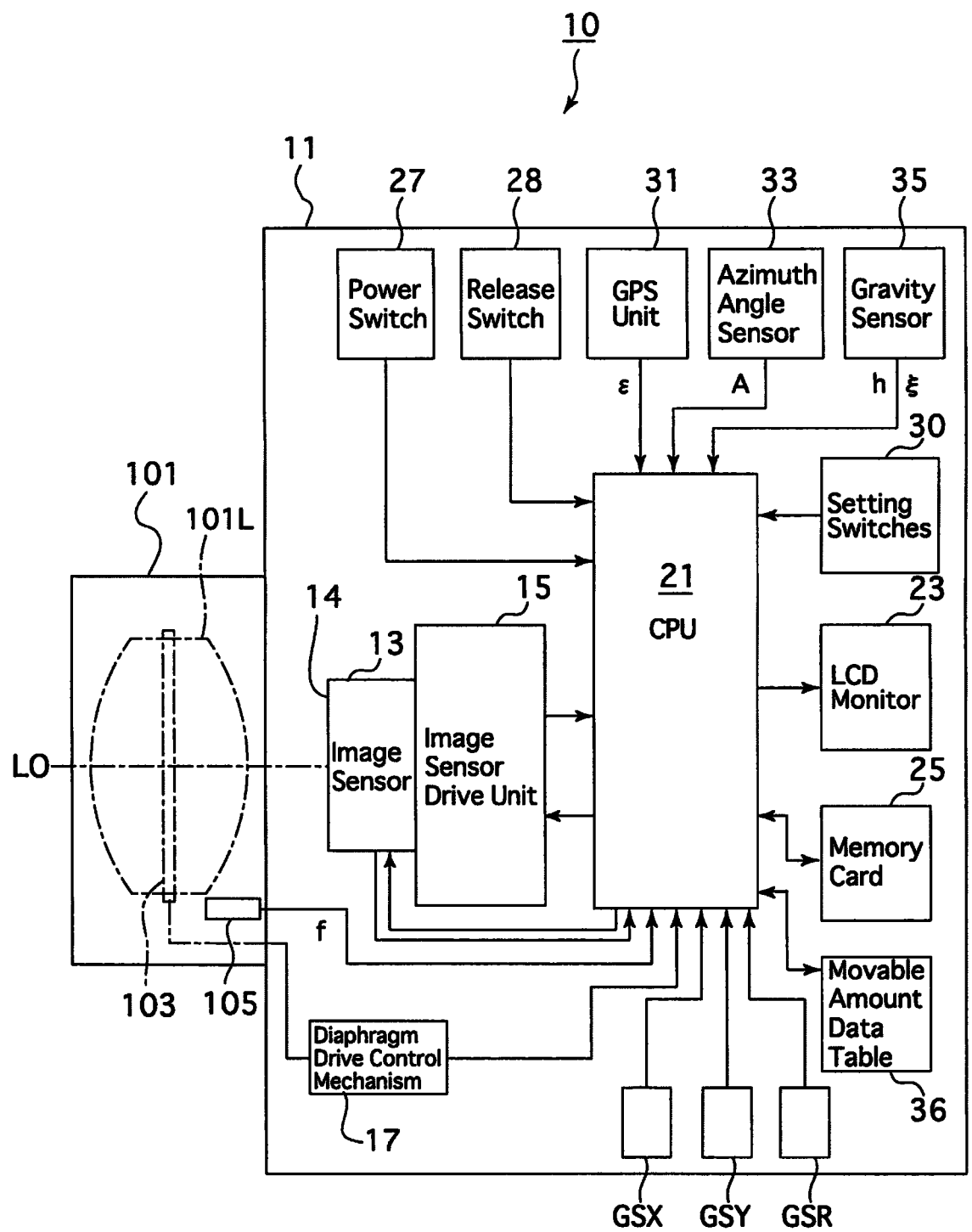
FIG. 1 is a block diagram illustrating main components of an embodiment of a digital camera serving as a celestial-object auto-tracking photographing apparatus according to the present invention, showing the basic configuration thereof.

As shown in FIG. 1, the digital camera 10 is provided with a camera body 11 and a photographing lens 101 (that contains a photographing optical system 101L). The digital camera 10 is provided, in the camera body 11 behind the photographing optical system 101L, with an image sensor (image pickup device) 13. An optical axis (photographing optical axis) LO of the photographing optical system 101L and an imaging surface (imaging area) 14 of the image sensor 13 are orthogonal to each other. The image sensor 13 is mounted onto an image sensor drive unit (image sensor mover/anti-shake unit) 15. The image sensor drive unit 15 is provided with a fixed stage, a movable stage which is movable relative to the fixed stage, and an electromagnetic circuit for moving the movable stage relative to the fixed stage. The image sensor 13 is held by the movable stage. The image sensor 13 (the movable stage) is controlled and driven to linearly move in desired directions orthogonal to the optical axis LO at a desired moving speed and to rotate about an axis parallel to the optical axis LO (instantaneous center at some point in a plane orthogonal to the optical axis LO) at a desired rotational speed. This type of image sensor drive unit is known in the art as an anti-shake unit of an image shake corrector (shake reduction system) incorporated in a camera disclosed in, e.g., Japanese Unexamined Patent Publication No. 2007-25616.

Figure 2A:
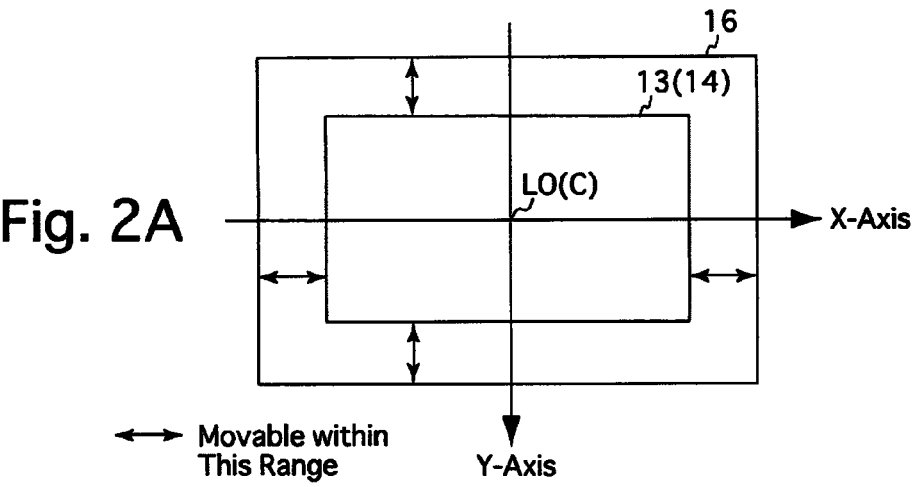
FIG. 2A is a diagram showing a state where the imaging surface of an image sensor is centered at the center of the range of movement thereof.

As shown in FIG. 2A, the imaging surface 14 of the image sensor 13 is in the shape of a rectangle. This rectangular imaging surface 14 constitutes an imaging area.

Figure 2B:
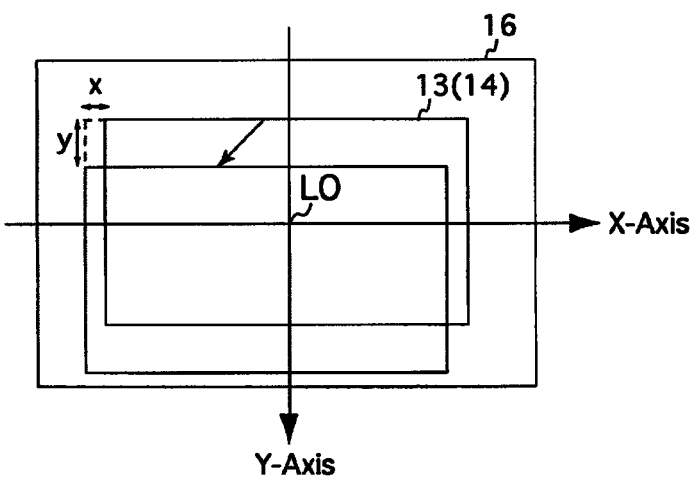
FIG. 2B is a diagram showing a state where the imaging surface of the image sensor linearly moves within the range of movement thereof.

As shown in FIG. 2B, the image sensor 13 (the imaging surface 14) is controlled and driven to linearly move in an X-Y plane orthogonal to the optical axis LO of the photographing optical system 101L at a desired moving speed within the range of movement 16 of the image sensor 13. In the following descriptions, the amount of rightward movement of the image sensor 13 in an X-direction and the amount of downward movement of the image sensor 13 in a Y-direction with respect to FIG. 2B are each expressed with a positive sign(+) and the amount of leftward movement of the image sensor 13 in the X-direction and the amount of upward movement of the image sensor 13 in the Y-direction with respect to FIG. 2B are each expressed with a negative sign(−).

Figure 2C:
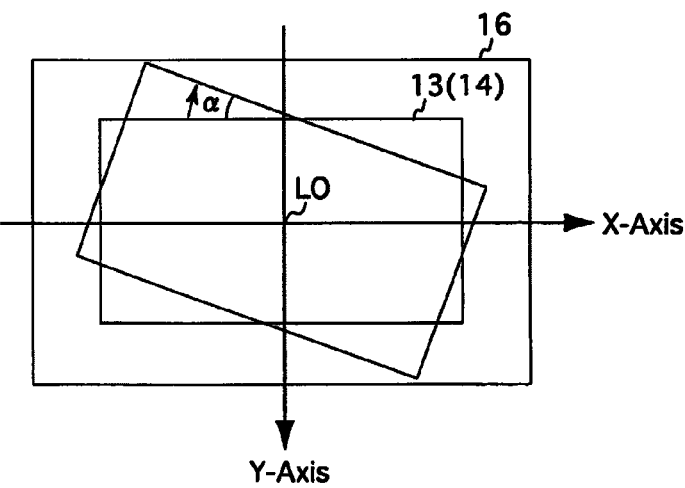
FIG. 2C is a diagram showing a state where the imaging surface of the image sensor rotates within the range of movement thereof.

As shown in FIG. 2C, the image sensor 13 (the imaging surface 14) is controlled and driven to rotate about an axis parallel to the optical axis LO of the photographing optical system 101L (about an instantaneous center at some point in a plane orthogonal to the optical axis LO) at a desired rotational speed within the range of movement 16 of the image sensor 13. In the following descriptions, the amount of rotational angle of the image sensor 13 in the counterclockwise direction with respect to FIG. 2C is expressed with a positive sign(+) and the amount of rotational angle of the image sensor 13 in the clockwise direction with respect to FIG. 2C is expressed with a negative sign(−).

The range of movement 16 of the image sensor 13 (the imaging surface 14) is defined by mechanical limits between the image sensor drive unit 15 and the camera body 11.

The photographing lens 101 is provided in the photographing optical system 101L with a diaphragm (adjustable diaphragm) 103. The f-number (degree of opening/closing the diaphragm 103) is controlled by a diaphragm drive control mechanism 17 provided in the camera body 11. The photographing lens 101 is provided with a focal length detector 105 which detects focal length information f of the photographing optical system 101L.

The camera body 11 is provided with an LCD monitor 23 which indicates images captured by the image sensor 13 and a removable memory card 25 in which data on images captured by the image sensor 13 are stored. The camera body 11 is provided with a power switch 27, a release switch 28 and a setting switch 30. The power switch 27 is for turning ON/OFF a power supply of the digital camera 10. The release switch 28 is for performing a focusing process, a photometering process and an image capturing process. The setting switch 30 is for selectively setting various photography modes (exposure modes) such as a celestial object auto tracking photography mode and a normal photography mode. The camera body 11 is provided with an X-direction gyro sensor GSX, a Y-direction gyro sensor GSY and a rotational-direction gyro sensor GSR which are for detecting vibrations applied to the digital camera 10 when the image sensor drive unit 15 is used as an anti-shake unit.

The camera body 11 is provided with a GPS unit 31, an azimuth sensor 33 and a gravity sensor 35. The GPS unit 31 detects latitude information $\epsilon$ at a photographic site of the digital camera 10. The azimuth angle sensor 33 detects photographing azimuth angle information A at a photographic site of the digital camera 10. The gravity sensor 35 includes the capability of leveling and detects information on photographing elevation angle h at a photographic site of the digital camera 10 and posture information $\xi$ (see FIG. 13) of the camera body 11 (the image sensor 13). The posture information $\xi$ denotes information on the angle of rotation of the camera body 11 (the image sensor 13) about the optical axis LO (center C of the imaging surface 14 of the image sensor 13) from a reference position of the camera body 11 (the image sensor 13). This reference position of the camera body 11 (the image sensor 13) is, e.g., a position (posture) in which the long-side direction of the image sensor 13 that is rectangular in shape is coincident with the horizontal direction (X-direction), and the angle (between the horizontal direction (X-direction) and a long-side direction X' (see FIG. 13) of the camera body 11 after the camera body 11 is rotated (tilted) about the optical axis LO corresponds to this rotational angle information.

The camera body 11 is provided with a movable-amount data table 36. The movable-amount data table 36 is a table of numerical data inherent to the specific digital camera 10 that is determined for each digital camera. In the case where the digital camera 10 is made to include the capability of automatically tracking and photographing celestial objects, according to the illustrated embodiment, as a default setting when the digital camera 10 is manufactured, the movable-amount data table 36 is secured and incorporated in the digital camera as data stored in a memory of the camera body 11 when the digital camera 10 is produced in a factory. In the case where the capability of automatically tracking and photographing celestial objects according to the illustrated embodiment is added to the digital camera 10 after being manufactured, the movable-amount data table 36 can be written in memory as additional data at a specified service center or the digital camera 10 can be made to retrieve the movable-amount data table 36 by itself and store this data table in a memory provided in the camera body 11 by updating the firmware.

As shown in FIG. 3, the movable-amount data table 36 stores numerical data on actual linearly-movable amounts of the image sensor 13 (the imaging surface 14) in directions orthogonal to the optical axis LO (i.e., in the X-direction and the Y-direction) from the reference posture position and actual rotatable amounts of the image sensor 13 (the imaging surface 14) about an axis parallel to the optical axis LO from the reference posture position in a corresponding manner. In the present embodiment, the reference posture position of the image sensor 13 (the imaging surface 14) is set at a position (the position shown in FIG. 2A) where the long sides of the rectangular imaging surface 14 extend in the horizontal direction (i.e., the X-direction) while the center of the imaging surface 14 is coincident with the optical axis LO of the photographing optical system 101L.

More specifically, on the assumption that the range of movement 16 of the image sensor 13 (the imaging surface 14) from the reference posture position in an X-Y plane orthogonal to the optical axis LO of the photographing optical system 101L is ±2 mm in each of the X-direction and the Y-direction, this range of movement 16 is virtually partitioned and arranged into a 8-by-8 matrix (in increments of 0.5 mm in each of the X-direction and the Y-direction), and the movable-amount data table 36 stores an actual rotatable amount of the image sensor 13 in each of a total of sixty-four partitions.

According to the movable-amount data table 36, the actual rotatable amount ranges from −2 degrees to +2 degrees when the image sensor 13 (the imaging surface 14) is at a position within a range of displacement from −0.5 mm to +0.5 mm from the reference posture position in each of the X-direction and the Y-direction (i.e., when the position of the image sensor 13 (the imaging surface 14) is in any of the central four partitions in FIG. 3). On the other hand, when the image sensor 13 (the imaging surface 14) is at a position within a range of displacement from +1.5 mm to +2.0 mm from the reference posture position in the X-direction and within a range of displacement from −2.0 mm to −1.5 mm from the reference posture position in the Y-direction (i.e., when the position of the image sensor 13 (the imaging surface 14) is in the right upper end partition in FIG. 3), the actual rotatable amount only ranges from −0.5 degrees to +0.3 degrees.

In the present embodiment, since the image sensor 13 (the imaging surface 14) that is rectangular in shape is used, the range of movement of the image sensor 13 (the imaging surface 14) from the reference posture position can be simply defined like the range of ± a number of mm in each of the X direction and the Y-direction if no rotational motion of the image sensor 13 (the imaging surface 14) is taken into account. However, if rotational motion of the image sensor 13 (the imaging surface 14) is taken into account, the range of movement of the image sensor 13 (the imaging surface 14) becomes complicated and difficult to be defined due to the following reasons. The actual rotatable amount of the image sensor 13 (the imaging surface 14) is great when the image sensor 13 (the imaging surface 14) is positioned in the vicinity of the center of the range of movement 16, and decreases as positioned closer to the edge of the range of movement 16. In addition, the actual rotatable amount of the image sensor 13 (the imaging surface 14) does not decrease by varying uniformly by mechanical limits between the image sensor drive unit 15 and the camera body 11. Additionally, even if the image sensor 13 (the imaging surface 14) is in the same position or a symmetrical position in the range of movement 16, the actual rotatable amount of the image sensor 13 (the imaging surface 14) sometimes varies between rotation in the clockwise direction and rotation in the counterclockwise direction.

Hence, in the present embodiment, the range of movement of the image sensor 13 (the imaging surface 14) can be easily and precisely determined by storing, in the movable-amount date table 36, data on the actual rotatable amounts of the image sensor 13 (the imaging surface 14) that correspond to the amounts of movement of the image sensor 13 (the imaging surface 14) in the X-direction and the Y-direction from the reference posture position.

The camera body 11 is provided with a CPU (movement data calculator/exposure time setter/imaging area shifter/imaging area mover) 21 which controls the overall operation of the digital camera 10.

The CPU 21 controls linear and rotational movements of the image sensor 13 via the image sensor drive unit 15 on the basis of the focal length information f that is input from the focal length detector 105, the latitude information ϵ that is input from the GPS unit 31, the photographing azimuth angle information A that is input from the azimuth angle sensor 33, the photographing elevation angle information h and the posture information ξ that are input from the gravity sensor 35, and the data (shown in FIG. 3) of the movable-amount data table 36.

Additionally, based on information on the motion of a celestial object image on the image sensor 13 (the imaging surface 14), the CPU 21 calculates theoretical linear movement amounts Δx, Δy of the image sensor 13 (the imaging surface 14) in directions orthogonal to the optical axis LO (in the X-direction and the Y-direction) per a specified period of time and a theoretical rotational angle amount α of the image sensor 13 (the imaging surface 14) about an axis parallel to the optical axis LO per the specified period of time.

The principle that the CPU 21 calculates the theoretical linear movement amounts Δx, Δy and the theoretical rotational angle amount α of the image sensor 13 (the imaging surface 14) per a specified period of time will be hereinafter discussed with reference to FIGS. 4 through 13.

[Photographing from the North Pole (90 Degrees North Latitude)]

Photographing from the north pole on the earth (90 degrees latitude) refers to photographing in a state (shown in FIG. 4) where the north star (Polaris), which lies in an extension of the earth's axis (axis of rotation of the earth), is coincident with the zenith.

Figure 4:
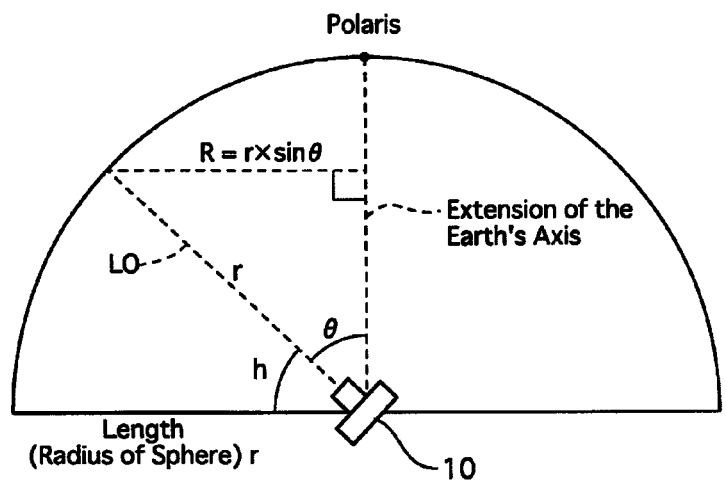
FIG. 4 is a diagram showing a manner of performing a celestial-object photographing operation at the North Pole with the radius of the celestial sphere defined as r.

It is herein assumed that the celestial sphere is an finite sphere, that "r" shown in FIG. 4 represents the radius of the celestial sphere, which is supposed to be infinite in reality, and that "θ" shown in FIG. 4 represents the angle of deviation of the optical axis LO of the photographing optical system 101L of the digital camera 10 from the north star (i.e., the angle between the direction toward the celestial pole and the optical axis LO). In this case, the photographing elevation angle h of the digital camera 10 is represented by the following formula:

$$90-\theta(h=90-\theta).$$

Figure 5:
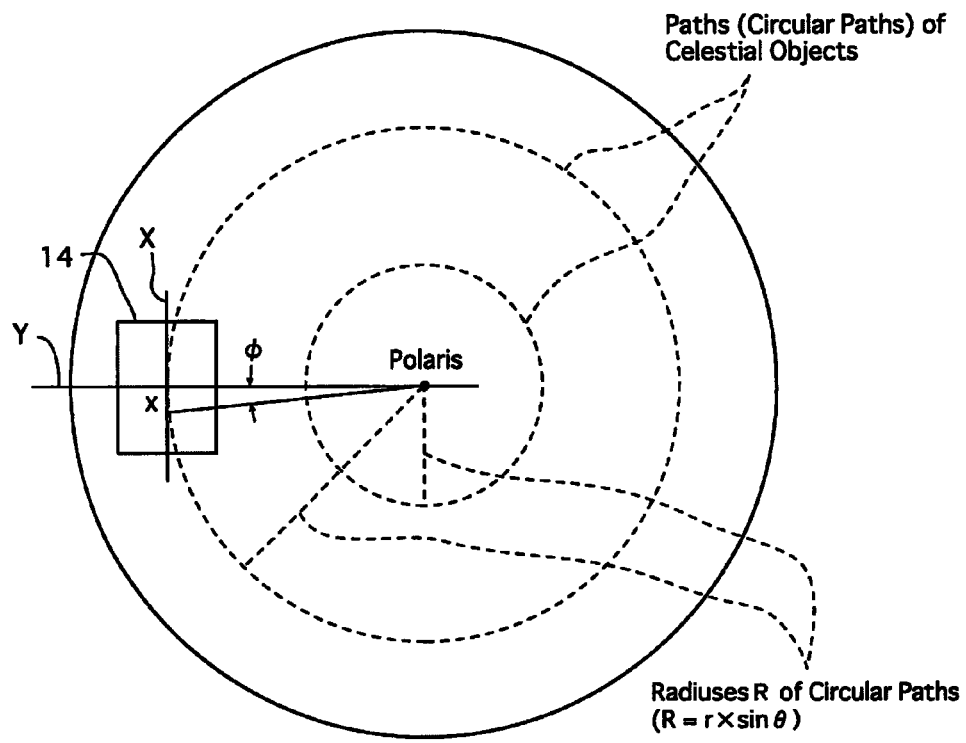
FIG. 5 is diagram illustrating the manner of performing a celestial-object photographing operation of FIG. 4 as viewed from directly below.

When the celestial sphere is viewed from directly below as shown in FIG. 5, each of all the celestial bodies traces a circular path about the north star (celestial pole). By designating R as the radius of this circular path, the radius R of the circular path depends on the photographing elevation angle h of the digital camera 10, thus being capable of being represented by θ. The radius R of the circular path can be given by the following equation:

$$R = r \times \sin\theta \tag{1}.$$

In the case where a celestial object rotates through an angle of ϕ every t second on the precondition that the celestial object rotates one revolution along a circular path through an angle of 360 degrees for 24 hours (=1440 minutes=86400 seconds), the following equation is established:

$$\phi = 0.004167 \times t \text{[deg]} \quad (2).$$

Figure 6:
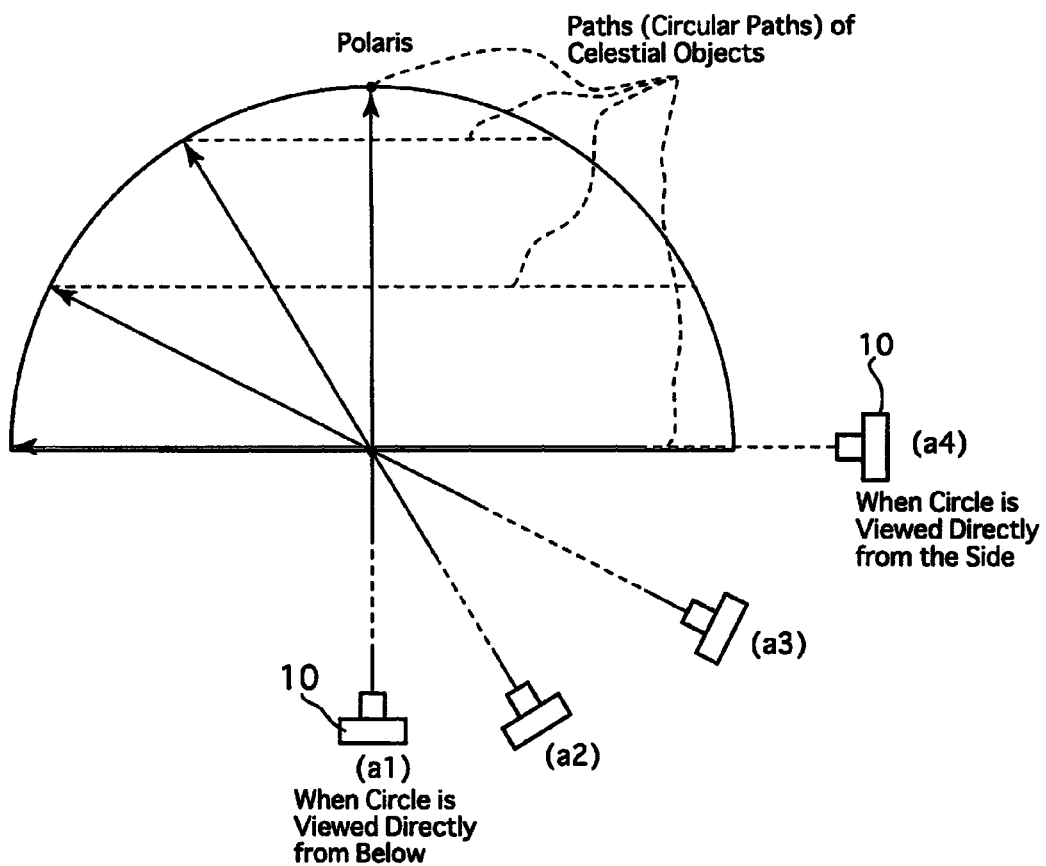
FIG. 6 is a diagram illustrating a path (circular path) of a celestial object viewed from different directions (a1) through (a4)
Figure 7:
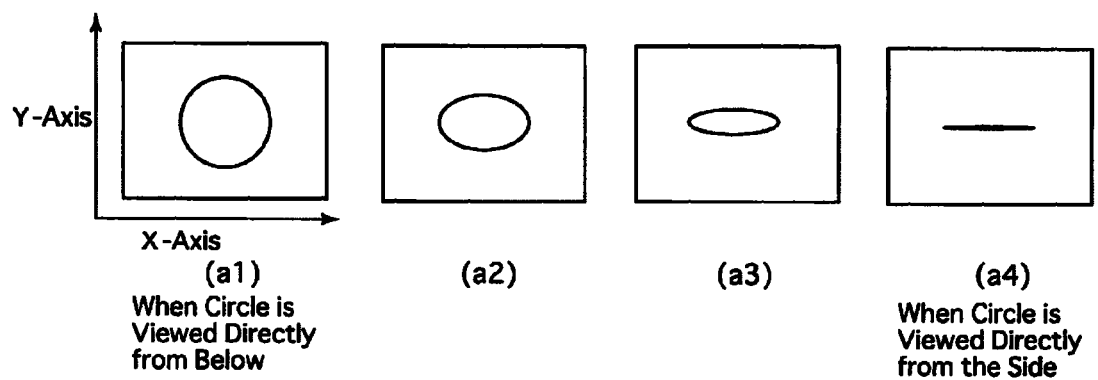
FIG. 7 is a diagram showing images of the circular path of the celestial object which are captured from the different directions (a1) through (a4)

Even if the path that a celestial object traces is circular as shown in FIGS. 5 and 6, the shape of this path varies depending on the viewing angle as shown in FIGS. 7(a1) through 7(a4); FIG. 7(a1) shows the image of a circular path of a celestial object as the circular path is viewed from just below, FIGS. 7(a2) and 7(a3) each show the image of the same circular path as the circular path is viewed obliquely from below and FIG. 7(a4) shows the image of the same circular path as the circular path is viewed directly from the side, so that the outcome is that the circular path varies in apparent shape depending on the viewing site. Accordingly, although a celestial object appears to move while tracing a circular path, the photographing elevation angle h of the digital camera 10 exerts an influence on the image formation state of the celestial object when the celestial object is actually photographed with the digital camera 10.

Since a circle appears as an ellipse as viewed from an oblique direction, these paths shown in FIG. 7 can be determined from the following equations:

$$Xr = R = r \times \sin\theta \quad (3), \text{ and}$$

$$Yr = R \times \cos\theta = r \times \sin\theta \times \cos\theta \quad (4),$$

wherein Xr represents the radius of the long axis of the ellipse, and
Yr represents the radius of the short axis of the ellipse.

Figure 8:
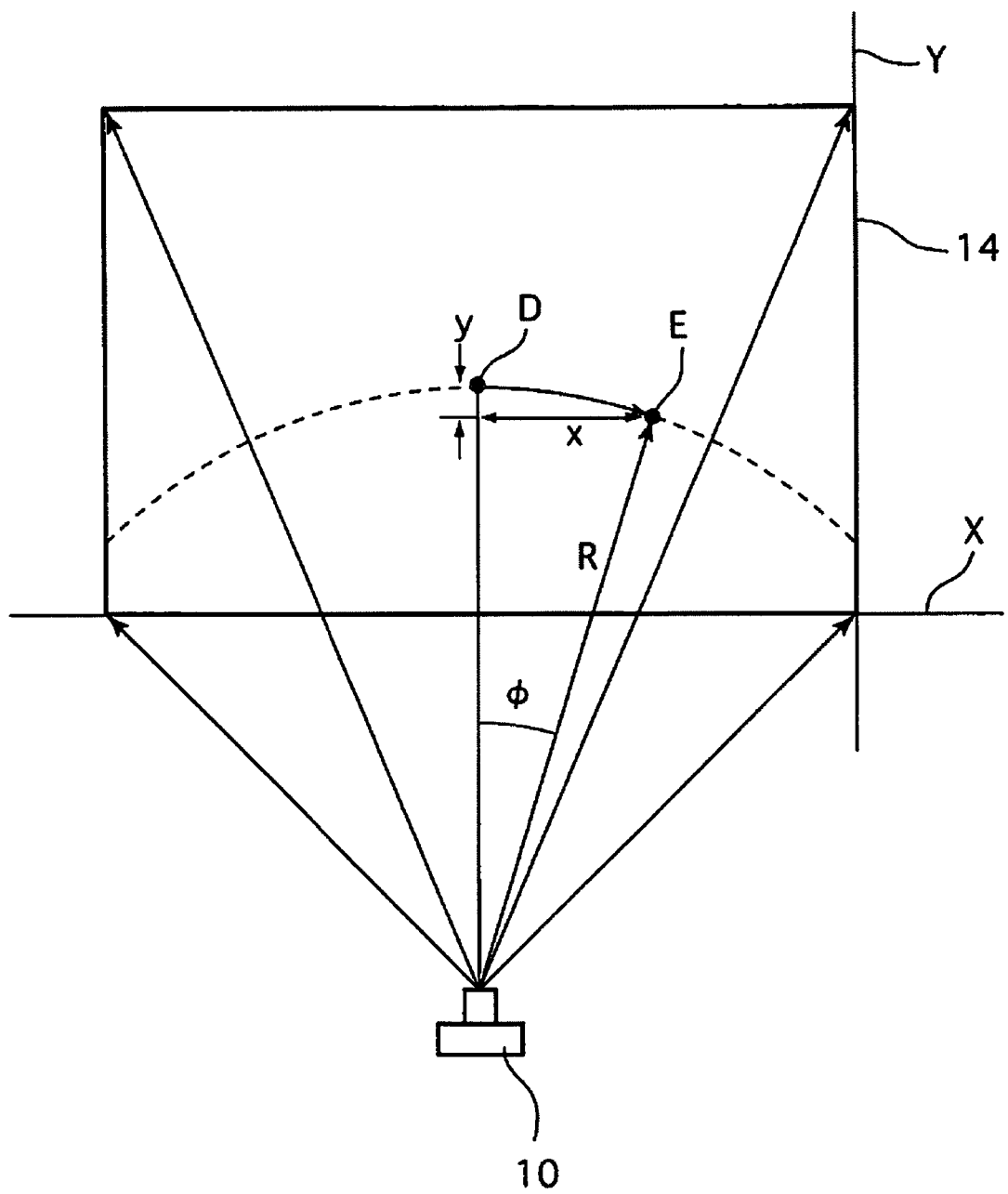
FIG. 8 is a diagram illustrating a path traced by an image of a celestial object due to the earth's rotation with a camera pointed at the celestial object.

Hence, as shown in FIGS. 5, 6 and 8, the path of a celestial object (the earth) when it rotates by an angle of ϕ° with the digital camera 10 pointed at the celestial object will be described hereinafter by dividing the path into components in the X-direction (direction of parallels of a celestial sphere) and the Y-direction (direction of meridians of the celestial sphere). The amount of movement x in the X-direction will be represented by the following equation:

$$x = R \times \sin\theta \quad (5).$$

The amount of movement y in the Y-direction varies depending on the viewing direction with respect to the circular path.

In FIG. 8, the path of the celestial object shown by a arrow extending from point D to point E is in the shape of a perfect circular arc as viewed from directly below (θ=0°), similar to the circular path shown in FIG. 7(a1). In reality, when θ=0°, the radius R of the circle is also 0, so that the circle merely appears as a single point; however, the radius R is assumed to be a finite value for the sake of simplicity. In this case, the amount of movement y in the Y-direction becomes maximum.

Additionally, since the amount of movement y in the Y-direction decreases as the path of the celestial object is viewed more obliquely, as shown in FIGS. 7(a2) and 7(a3), the amount of movement y in the Y-direction becomes minimum (=0) as the circular path is viewed directly from the side as shown in FIG. 7(a4). It can be understood from FIG. 8, in which the path of the celestial object is circular arc in shape, that the maximum amount of movement Ymax in the Y-direction is represented by the following equation:

$$Y\max = R - R \times \cos\phi \quad (6).$$

Therefore, the amount of movement y in the Y-direction is represented by the following equation:

$$y = Y\max \times \cos\theta = (R - R \times \cos\phi) \times \cos\theta \quad (7).$$

If the equation (1) is substituted into the equations (5) and (7), the amount of movement x in the X-direction and the amount of movement y in the Y-direction are represented by the following equations:

$$x = r \times \sin\theta \times \sin\phi \quad (8), \text{ and}$$

$$y = r \times \sin\theta \times \cos\theta (1 - \cos\phi) \quad (9).$$

To perform calculations on a celestial sphere using the actual digital camera 10, the movement amounts Δx, Δy on the imaging surface 14 in the X-direction and the Y-direction projected onto the imaging surface 14 are obtained. The radius r of the celestial sphere that is infinity is expressed by the focal length f of the photographing lens 101, and the movement amounts Δx, Δy are calculated using the following equations:

$$\Delta x = f \times \sin\theta \times \sin\phi \quad (10), \text{ and}$$

$$\Delta y = f \times \sin\theta \times \cos\theta (1 - \cos\phi) \quad (11).$$

Accordingly, the amount of movement of the image sensor 13 in a plane orthogonal the optical axis LO varies depending on the focal length f of the photographing lens 101 mounted to the digital camera 10.

Figure 9:
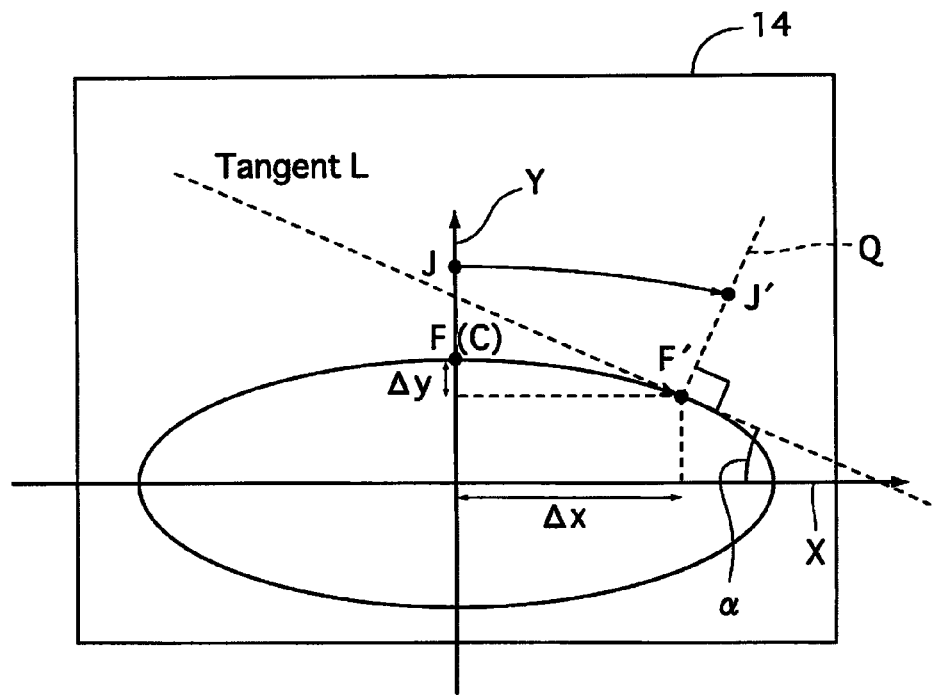
FIG. 9 is a diagram showing a manner of tracking a celestial object while capturing the celestial object at the center of the image sensor when the celestial object moves while tracing an apparent elliptic (circular) path.

Subsequently, it is determined how much the image sensor 13 should rotate about the center thereof at a time of exposure. As described above, the path of a celestial object looks a circular path or an elliptical path as viewed from the digital camera 10. When the celestial object shown as a point F in FIG. 9 moves while tracing an elliptical (circular) path as shown in FIG. 9, the center C of the imaging surface 14 of the image sensor 13 only needs to be moved in the X-direction and the Y-direction by the movement amounts Δx, Δy if the digital camera 10 is made to follow the movement from the point F to a point F' with the point F captured at the center of the image sensor 13 (that corresponds to the center C of the imaging surface 14). However, in the case where, e.g., a celestial object J exists in the vicinity of the point F, the point J moves to a point J'. To make the digital camera 10 follow the point J also, the image sensor 13 only needs to be rotated about the center C of the image sensor 13. The angle of this rotation of the image sensor 13 corresponds to the angle α of the inclination of a tangent L to the ellipse at the point F' (i.e., the angle between a tangent to the ellipse at the point F and the tangent to the ellipse at the point F'). In the following descriptions, the long-side direction and the short-side direction of the image sensor 13 are defined as the direction of an X-axis (X-direction) and the direction of a Y-axis (Y-direction), respectively.

Figure 10:
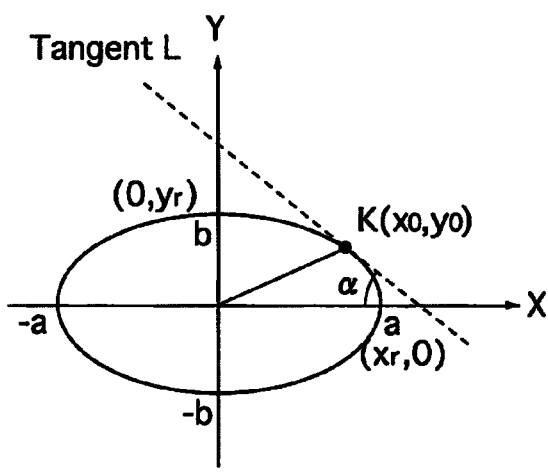
FIG. 10 is a diagram illustrating a relationship between an ellipse and a tangent line to the ellipse.

In an X-Y coordinate system and an ellipse like those shown in FIG. 10, the equation of the tangent L to the ellipse at a point K is expressed by the following equation:

$$x0 \times x/a^2 + y0 \times y/b^2 = 1.$$

In FIG. 10, a point "a" and a point "b" correspond to the radius Xr of the long axis in the equation (3) and the radius Yr of the short axis in the equation (4), respectively.

If the aforementioned equation of the tangent L is modified into the equation for Y (Y= . . . ), the following equation is obtained:

$$Y = -(b^2 \times x0)/(a^2 \times y0) \times x - 1/(a^2 \times y0).$$

The angle between the tangent L to this ellipse and the X-axis corresponds to the rotational angle α of an image about the center thereof.

The inclination of a straight line Q orthogonal to the tangent L to the ellipse is expressed by the following expression:

$$-(b^2 \times x0)/(a^2 \times y0).$$

Accordingly, the rotational angle α which is to be determined is obtained by the following equation:

$$\alpha = \arctan(-(b^2 \times x0)/(a^2 \times y0)) \quad (12).$$

[Latitude Other than 90°]

The above descriptions are directed to the case where the latitude of a photographic site is 90 degrees (namely, the north star (celestial pole) is right above the digital camera 10). Next, the case where the latitude at a photographic site is other than 90° will be hereinafter discussed with reference to FIGS. 11 and 12.

Figure 11:
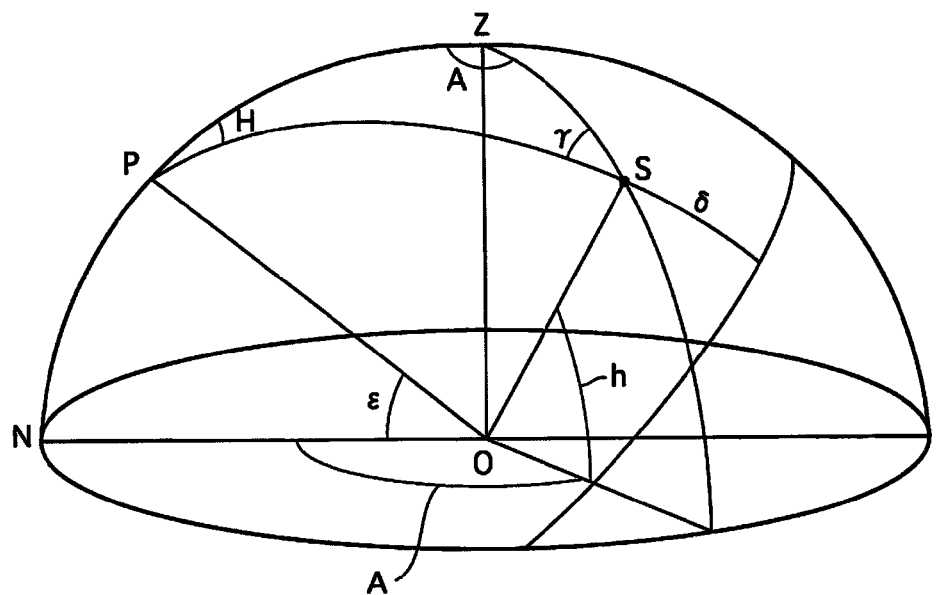
FIG. 11 is a celestial chart illustrating celestial-object auto-tracking photography according to the present invention.

In FIG. 11 that shows a manner of astrophotography in the Northern Hemisphere, each designator is defined as follows:

P: celestial pole,

Z: zenith,

N: true north,

S: target celestial object (photographic target point) (for the purpose of illustration, this target celestial object (star) shall correspond to the center of the imaging surface 14 and shall be positioned on an extension of the optical axis LO of the photographing lens 101. However, the optical axis LO, of course, does not need to be made coincident with any celestial object when astrophotography is carried out), ε: latitude at a photographic site, A: photographing azimuth angle (azimuth of the target celestial object S, at which the photographing lens 101 is pointed, or azimuth angle of the point of intersection between the optical axis LO of the photographing lens 101 and the celestial sphere), h: photographing elevation angle (altitude of the target celestial object S, at which the photographing lens 101 is pointed, or altitude of the point of intersection between the optical axis LO of the photographing lens 101 and the celestial sphere), H: hour angle of the target celestial object S (time is normally used as the unit of hour angle; however, hour angle shall be herein converted into an angle (1 hour=15 degrees) to be dealt with)

δ: declination of the target celestial object S, and

γ: the angle between a curved line which connects the celestial pole P and the target celestial object S to each other by the shortest distance and a curved line which connects the zenith Z and the target celestial object (star) S to each other by the shortest distance.

In FIG. 11, if ∠POS, which is the angle between Polaris and the photographic target point (target celestial object) S, can be determined, the path of the celestial object can be determined by substituting ∠POS for the angle θ shown in FIG. 4.

Figure 12:
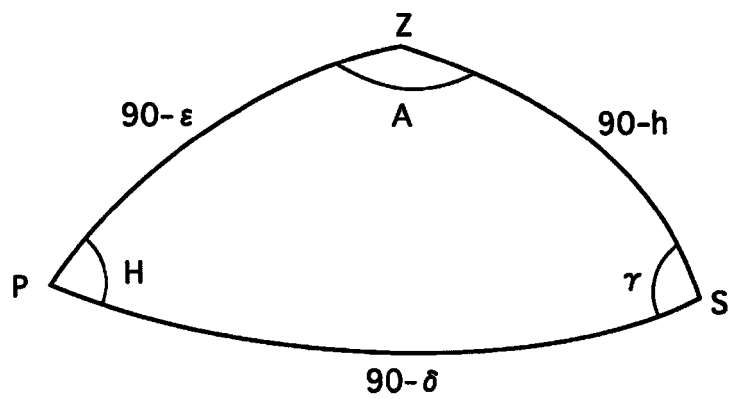
FIG. 12 is a diagram illustrating a spherical triangle on the celestial hemisphere shown in FIG. 11 which connects the north pole, a target celestial object and the zenith.
Figure 13:
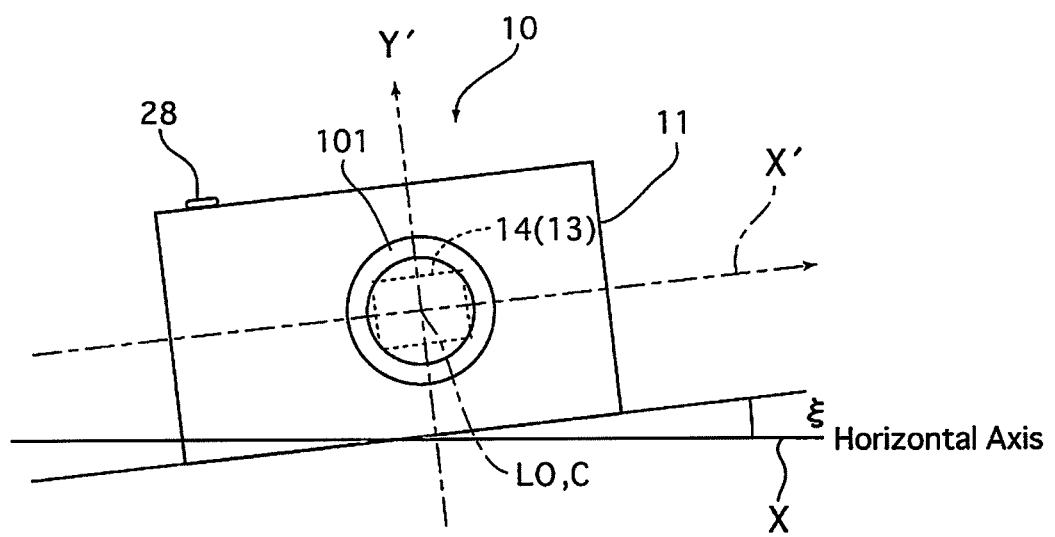
FIG. 13 is a diagram showing a state where the digital camera is inclined from a horizontal position about the photographing optical axis.

∠POS is equal to the length of a curved line PS shown in FIG. 12 in the case where the radius of the sphere is assumed to be 1. Therefore, the following equation is obtained using the law of cosines for triangles:

$$\cos(\angle POS) = \cos(90-\epsilon) \times \cos(90-h) + \sin(90-\epsilon) \times \sin(90-h) \times \cos(A) = \sin(\epsilon) \times \sin(h) + \cos(\epsilon) \times \cos(h) \times \cos(A),$$

and accordingly, ∠POS is expressed by the following equation:

$$\angle POS = \arccos[\sin(\epsilon) \times \sin(h) + \cos(\epsilon) \times \cos(h) \times \cos(A)] \quad (13).$$

Therefore, if ∠POS is substituted for θ in the equations (8) through (11), the amount of movement x and the amount of movement y of a celestial object in the X-direction and the Y-direction at a given latitude ε can be determined.

In addition, a correction needs to be made to the moving direction of the target celestial object depending on the posture of the digital camera 10. In the case where the digital camera 10 is turned upward by the photographic elevation angle h to be pointed at the target celestial object S with the digital camera 10 held horizontally, the angle between a horizontal surface and the equator at the target celestial object becomes γ. As described above, the posture of the digital camera 10 corresponds to the angle of rotation of the camera body 11 (the image sensor 13) about the optical axis LO from the reference position of the camera body 11 (the image sensor 13), and the posture of the digital camera 10 when the lengthwise direction of the imaging surface 14 is horizontal is designated as a horizontal posture of the digital camera 10.

From the law of sines for triangles, the following equation is obtained:

$$\tan(\gamma) = \sin(90-\epsilon) \times \sin(A)/(\cos(90-\epsilon) \times \sin(90-h) - \sin(90-\epsilon) \times \cos(90-h) \times \cos(A)) = \cos(\epsilon) \times \sin(A)/(\sin(\epsilon) \times \cos(h) - \cos(\epsilon) \times \sin(h) \times \cos(A)),$$

and accordingly, γ is expressed by the following equation:

$$\gamma = \arctan[\cos(\epsilon) \times \sin(A)/(\sin(\epsilon) \times \cos(h) - \cos(\epsilon) \times \sin(h) \times \cos(A))] \quad (14).$$

Accordingly, to convert the amount of movement x and the amount of movement y of a celestial object in the X-direction and the Y-direction into an amount of lateral movement Δx and an amount of vertical movement Δy in an X-Y coordinate system (row-and-column coordinate system of the camera (image sensor)) on the imaging surface 14 using the above calculated γ, the following equations (I) and (II) are used:

$$\Delta x = x \times \cos(\gamma) + y \times \sin(\gamma) \quad (I), \text{ and}$$

$$\Delta y = x \times \sin(\gamma) + y \times \cos(\gamma) \quad (II).$$

Additionally, in the case where the posture of the digital camera 10 is such that the image sensor 13 is inclined with respect to the horizontal direction (has been rotated from the horizontal direction) at the angle ξ about the optical axis LO of the photographing lens 101, the amount of lateral movement Δx and the amount of vertical movement Δy of the image sensor 13 can be corrected according to the following equations (III) and (IV):

$$\Delta x = x \times \cos(\gamma+\xi) + y \times \sin(\gamma+\xi) \quad (III), \text{ and}$$

$$\Delta y = x \times \sin(\gamma+\xi) + y \times \cos(\gamma+\xi) \quad (IV).$$

The aforementioned amount of lateral movement Δx, amount of vertical movement Δy and rotational angle α of the image sensor 13 are calculated in a manner which will be discussed hereinafter.

The direction to the north celestial pole P of the celestial sphere can be regarded to be invariant regardless of date and time, thus being capable of being calculated from the latitude at a photographic site. In addition, the direction to the zenith Z can also be calculated from the latitude. Accordingly, first of all, after composition is determined, the digital camera 10 is fixedly installed so that the target celestial object(s) is projected onto the imaging surface 14. In this composition with the digital camera 10, the GPS unit 31 inputs the latitude information ε to the CPU 21, the azimuth angle sensor 33 inputs the photographing azimuth angle information A to the CPU 21, and the gravity sensor 35 inputs the information on photographing elevation angle h and the posture information (rotational angle information) ξ to the CPU 21. From this information input to the CPU 21, the CPU 21 determines the points of the zenith Z, the celestial pole P, and the target celestial object S at the center of the picture plane.

Upon determining the above three points Z, P and S, the CPU 21 calculates the theoretical linear movement amounts Δx, Δy and the theoretical rotational angle amount α of the image sensor 13 (the imaging surface 14) per a specified period of time from the focal length information f of the photographing lens 101, which is input from the focal length detector 105, and the posture information (rotational angle information) ξ.

The CPU 21 sets an exposure time for completing the celestial-object auto-tracking photographing operation while moving the image sensor 13 (the imaging surface 14) within the range of movement 16 thereof by comparing the calculated theoretical linear movement amounts Δx, Δy and theoretical rotational angle amount α of the image sensor 13 (the imaging surface 14) per a specified period of time with the actual linearly-movable amounts and the actual rotatable amounts of the image sensor 13 (the imaging surface 14) that the movable-amount data table 36 stores.

More specifically, the CPU 21 calculates the theoretical linear movement amounts ((Δx, Δy), 2(Δx, Δy), . . . ) and the theoretical rotational angle amount (α, 2α, . . . ) at each step while stepwisely increasing a specified period of time required to calculate the theoretical linear movement amounts Δx, Δy and the theoretical rotational angle amount α. The CPU 21 sequentially determines whether or not the calculated theoretical linear movement amounts and the calculated theoretical rotational angle amount at each step exceeds the corresponding actual linearly-movable amounts and the corresponding actual rotatable amount that are stored in the movable-amount data table 36, respectively. Subsequently, upon determining that any one of the calculated theoretical linear movement amounts and the theoretical rotational angle amount at a specific step exceeds the corresponding actual linearly-movable amount or the corresponding actual rotatable amount that are stored in the movable-amount data table 36, an exposure time shorter than the specified period of time at the specific step is set. For instance, the CPU 21 takes a specified period of time at a step that is one step before the specific step as a maximum exposure time, and sets an exposure time shorter than this maximum exposure time.

Figure 14A:
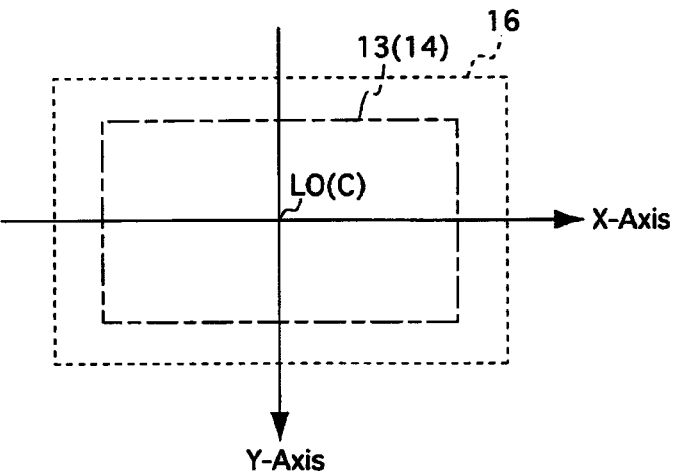
FIGS. 14A, 14B and 14C show a state of comparisons of calculated theoretical linear movement amounts and theoretical rotational angle amounts of the imaging area of the image sensor per a specified period of time with linearly-movable amounts and actual rotatable amounts of the imaging area of the image sensor per the specified period of time that are stored by the movable-amount data table.
Figure 14B:
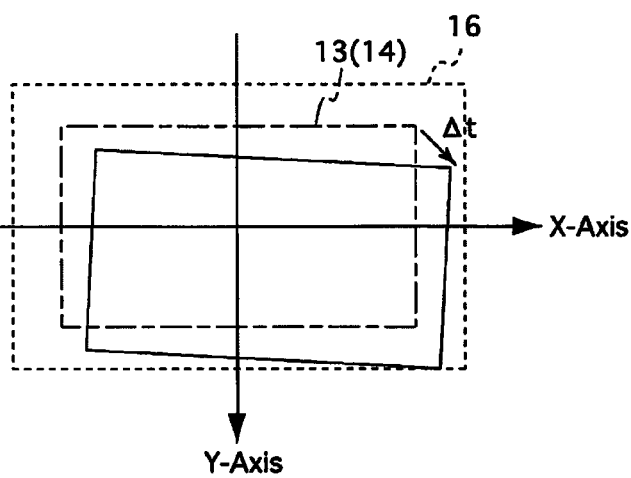
Figure 14C:
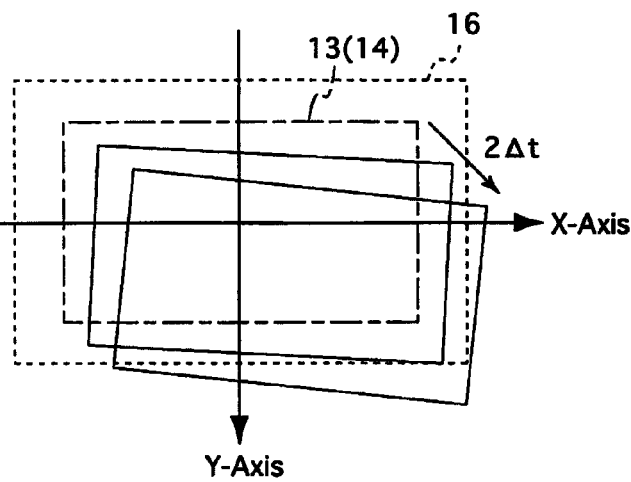

In the example shown in FIGS. 14A through 14C, with respect to the range of movement 16 (shown by doted lines), the reference posture position (shown in FIG. 14A) of the image sensor 13 (the imaging surface 14) is determined as an initial position thereof (one-dot chain lines), and the theoretical linear movement amounts Δx and Δy and the theoretical rotational angle amount α at a specified period of time Δt from the initial position are within the actual linearly-movable amounts and the actual rotatable amounts of the image sensor 13 (the imaging surface 14) stored in the movable-amount data table 36 (see FIG. 14B); however, the theoretical linear movement amounts 2Δx, 2Δy and the theoretical rotational angle amount 2α at a specified period of time 2Δt from the initial position exceed the actual linearly-movable amounts and the actual rotatable amounts of the image sensor 13 (the imaging surface 14) stored in the movable-amount data table 36 (see FIG. 14C). Accordingly, the CPU 21 takes a specified period of time Δt at one step before the period of time 2Δt, as a maximum exposure time Tmax and sets an exposure time shorter than this maximum exposure time Tmax.

The CPU 21 shifts the initial position of the image sensor 13 (the imaging surface 14) according to the calculated theoretical linear movement amounts Δx and Δy, and theoretical rotational angle amount α of the image sensor 13 (the imaging surface 14) per a specified period of time.

Figure 15:
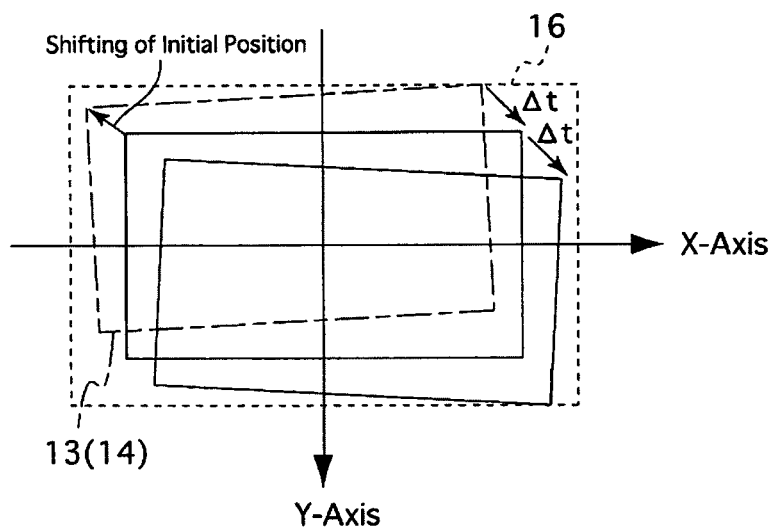
FIG. 15 is a first diagram showing a state of a shifting of the initial position of the image sensor before the commencement of movement of the imaging area.

For instance, as shown in FIG. 15, the CPU 21 shifts the initial position of the image sensor 13 (the imaging surface 14) by linear movement amounts −Δx, −Δy, and a rotational angle amount −α in the direction opposite to the direction in the case of the calculated theoretical linear movement amounts Δx, Δy, and theoretical rotational angle amount α of the image sensor 13 (the imaging surface 14) per a specified period of time (see the one-dot chain lines in FIG. 15). This shifting makes it possible to obtain a maximum exposure time (exposure time) 2Δt, which is double the maximum exposure time Δt in the case where the CPU 21 does not shift the initial position of the image sensor 13 (the imaging surface 14).

Figure 16:
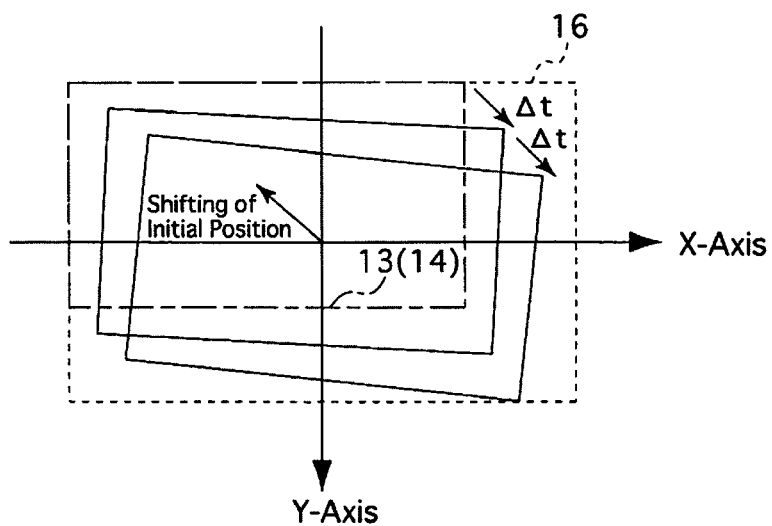
FIG. 16 is a second diagram showing a state of a shifting of the initial position of the image sensor before the commencement of movement of the imaging area.

Alternatively, the CPU 21 can fully shift the initial position of the image sensor 13 (the imaging surface 14) to the limit in the range of movement 16 in the direction of the linear movement amounts −Δx and −Δy without rotating the image sensor 13 (the imaging surface 14) as shown in FIG. 16. This makes it possible to obtain a maximum exposure time (exposure time) longer than the maximum exposure time (exposure time) Δt that is obtained in the case where the CPU 21 does not shift the initial position of the image sensor 13 (the imaging surface 14).

Figure 17:
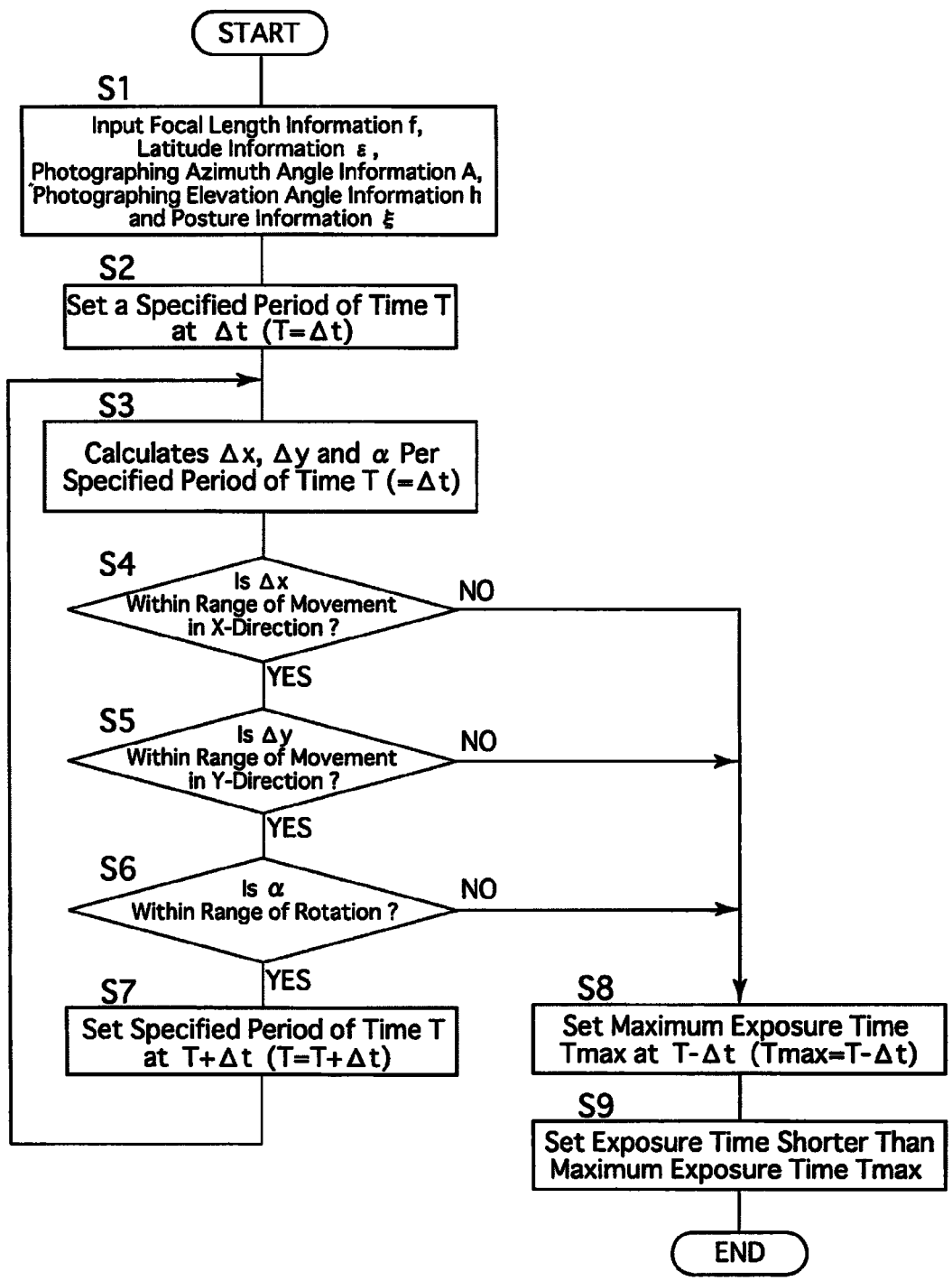
FIG. 17 is a flow chart showing a manner of setting an exposure time in celestial-object auto-tracking photography according to the present invention.

A method of setting an exposure time in the celestial object auto tracking photography mode of the digital camera 10 will be hereinafter discussed with reference to FIG. 17.

First the focal length information f of the photographing lens 101 is input to the CPU 21 from the focal length detector 105, the latitude information ε is input to the CPU 21 from the GPS unit 31, the photographing azimuth angle information A is input to the CPU 21 from the azimuth angle sensor 33, and the photographing elevation angle information h and the posture information ξ are input to the CPU 21 from the gravity sensor 35 (step S1).

Subsequently, the CPU 21 sets a specified period of time T required to calculate the theoretical linear movement amounts Δx, Δy, and the theoretical rotational angle amount α of the image sensor 13 (the imaging surface 14) at Δt (e.g., 10 seconds) (step S2).

Subsequently, based on the input focal length information f, latitude information ε, photographing azimuth angle information A, photographing elevation angle information h and posture information ξ and also the set specified period of time T(=Δt), the CPU 21 calculates the theoretical linear movement amounts Δx, Δy, and the theoretical rotational angle amount α of the image sensor 13 (the imaging surface 14) per the specified period of time T(=Δt) (step S3).

At this time, the CPU 21 can shift the initial position of the image sensor 13 (the imaging surface 14), which is the position of the image sensor 13 (the imaging surface 14) before the commencement of movement thereof, in accordance with the calculated theoretical linear movement amounts Δx, Δy, and theoretical rotational angle amount α of the image sensor 13 (the imaging surface 14) per the specified period of time T(=Δt) as shown in FIGS. 15 and 16. It is of course possible to omit this initial position shifting operation and move the image sensor 13 (the imaging surface 14) from the reference posture position thereof.

Subsequently, by referring to the movable-amount data table 36, the CPU 21 determines whether or not the calculated theoretical linear movement amount Δx of the image sensor 13 (the imaging surface 14) per the calculated specified period of time T(=Δt) exceeds the corresponding actual linearly-movable amount that is stored in the movable-amount data table 36 (step S4), whether or not the calculated theoretical linear movement amount Δy of the image sensor 13

(the imaging surface 14) per the calculated specified period of time T(=Δt) exceeds the corresponding actual linearly-movable amount that is stored in the movable-amount data table 36 (step S5), and whether or not the calculated theoretical rotational angle amount α of the image sensor 13 (the imaging surface 14) per the calculated specified period of time T(=Δt) exceeds the corresponding actual rotatable amount that is stored in the movable-amount data table 36 (step S6).

If the CPU 21 determines that the calculated theoretical linear movement amount Δx does not exceed the corresponding actual linearly-movable amount that is stored in the movable-amount data table 36 (if YES at step S4), that the calculated theoretical linear movement amount Δy does not exceed the corresponding actual linearly-movable amount that is stored in the movable-amount data table 36 (if YES at step S5), and that the calculated theoretical rotational angle amount α does not exceed the corresponding actual rotatable amount that is stored in the movable-amount data table 36 (if YES at step S6), the CPU 21 sets the specified period of time T at a period of time "T+Δt" (e.g., 20 seconds) (step S7), and control returns to step S3.

Subsequently, based on the set specified period of time T(=2Δt), the CPU 21 once again calculates the theoretical linear movement amounts 2(Δx, Δy) and the theoretical rotational angle amount 2α of the image sensor 13 (the imaging surface 14) per the specified period of time T(=2Δt) (step S3).

Subsequently, by referring to the movable-amount data table 36, the CPU 21 determines whether or not the calculated theoretical linear movement amount 2Δx of the image sensor 13 (the imaging surface 14) per the calculated specified period of time T(=2Δt) exceeds the corresponding actual linearly-movable amount that is stored in the movable-amount data table 36 (step S4), whether or not the calculated theoretical linear movement amount 2Δy of the image sensor 13 (the imaging surface 14) per the calculated specified period of time T(=2Δt) exceeds the corresponding actual linearly-movable amount that is stored in the movable-amount data table 36 (step S5), and whether or not the calculated theoretical rotational angle amount 2α of the image sensor 13 (the imaging surface 14) per the calculated specified period of time T(=2Δt) exceeds the corresponding actual rotatable amount that is stored in the movable-amount data table 36 (step S6).

In the above described manner, the CPU 21 calculates the theoretical linear movement amounts ((Δx, Δy), 2(Δx, Δy), . . . ) and the theoretical rotational angle amount (α, 2α, . . . ) at each step while stepwisely increasing the specified period of time T that is required to calculate the theoretical linear movement amounts Δx, Δy, and the theoretical rotational angle amount α. The CPU 21 sequentially determines whether or not either of the calculated theoretical linear movement amounts or the calculated theoretical rotational angle amount at each step exceeds the corresponding actual linearly-movable amount or the corresponding actual rotatable amount that are stored in the movable-amount data table 36, respectively (steps S3 through S7).

At some point during this determination process, the CPU 21 eventually determines that either of the calculated theoretical linear movement amounts or the theoretical rotational angle amount of the image sensor 13 (the imaging surface 14) per the specified period of time T(=Δt) at a specific step exceeds the corresponding actual linearly-movable amount or the corresponding actual rotatable amount that are stored in the movable-amount data table 36, respectively (NO at step S4, NO at step S5, or NO at step S6).

Thereupon, the CPU 21 sets a specified period of time T−Δt at one step before the specific step as a maximum exposure time Tmax (step S8). The CPU 21 makes the LCD monitor 23 indicate the set maximum exposure time Tmax in real time. Lastly, the CPU 21 sets an exposure time shorter than the maximum exposure time Tmax manually by the user or automatically (step S9).

The CPU 21 performs an exposure operation while controlling the operation of the image sensor 13 (the imaging surface 14) so that it linearly moves in directions orthogonal to the optical axis LO and rotates about an axis parallel to the optical axis LO so as to trace a path based on the calculated theoretical linear movement amounts Δx, Δy, and theoretical rotational angle amount α of the image sensor 13 (the imaging surface 14) per the calculated specified period of time T(=Δt) until the set exposure time elapses. This makes a celestial object image which is formed on the imaging surface 14 of the image sensor 13 via the photographing optical system 101L of the digital camera 10 stationary with respect to the imaging surface 14 of the image sensor 13 during a long exposure, thus making capturing of a still image of a celestial object or objects possible in a state where each celestial object appears stationary in long exposure astrophotography simply by making an exposure with the digital camera 10 fixed with respect to the ground (earth).

Subsequently, upon a lapse of the set exposure time, the CPU 21 terminates the exposure operation. Thereafter, the CPU 21 reads out image data on the captured image from the image sensor 13 and performs image processing operations such as a white balance adjustment operation and an image processing operation for converting the format type into a predetermined type of format. Lastly, the CPU 21 causes the image data on the captured image, on which the aforementioned image processing operations have been performed, to be displayed on the LCD monitor 23, and stores this image data into the memory card 25 as an image file of a predetermined format.

As described above, according to the method of automatically tracking and photographing celestial objects and the celestial-object auto-tracking photographing apparatus according to the present invention, based on movement information of a celestial object image on the image sensor 13 (the imaging surface 14), the CPU 21 calculates the theoretical linear movement amounts Δx and Δy of the image sensor 13 (the imaging surface 14) in directions orthogonal to the optical axis LO (in the X-direction and the Y-direction) per a specified period of time and the theoretical rotational angle amount α of the image sensor 13 (the imaging surface 14) about an axis parallel to the optical axis LO per the specified period of time, the CPU 21 obtains the movable-amount data table 36, which stores data on actual linearly-movable amounts of the image sensor 13 (the imaging surface 14) in directions orthogonal to the optical axis LO from the reference posture position and actual rotatable amounts of the image sensor 13 (the imaging surface 14) about an axis parallel to the optical axis LO from the reference posture position in a corresponding manner, and the CPU 21 sets an exposure time for completing the celestial-object auto-tracking photographing operation while moving the image sensor 13 (the imaging surface 14) within the range of movement 16 thereof by comparing the calculated theoretical linear movement amounts Δx, Δy, and theoretical rotational angle amount α of the image sensor 13 (the imaging surface 14) per the specified period of time with the actual linearly-movable amounts and the actual rotatable amounts of the image sensor 13 (the imaging surface 14) that are stored in the movable-amount data table 36. This process makes it possible to set as long exposure time as possible in real time with high precision within a range in which the image sensor 13 (the imaging surface 14) does not move beyond the range of movement 16 thereof. In addition, since the maximum exposure time available for astrophotography can be grasped beforehand, additional calculation beyond this maximum exposure time does not have to be performed for the calculation for obtaining information on motion (path) of a celestial object on the image sensor 13 (the imaging surface 14), which makes it possible for the CPU 21 to perform computing processing in a practically sufficient time interval even if the CPU 21 is low-powered.

In the above described embodiment, the image sensor 13 (the imaging surface 14) is physically moved linearly and rotated under the drive control of the image sensor drive unit 15 that is exercised by the CPU 21, and the entire imaging area of the image sensor 13 is defined as "imaging area". However, the imaging surface 14 of the image sensor 13 can be partly electronically trimmed into a trimmed area (trimmed imaging area), and this trimmed area can be defined as "imaging area." In this case, by sending a trimming command signal to the image sensor 13 by the CPU 21 in FIG. 1, it is possible to perform a celestial-object auto-tracking photographing operation while linearly moving the trimmed area of the image sensor 13 in directions orthogonal to the optical axis LO of the photographing optical system 101L and also rotating the same trimmed area of the image sensor 13 about an axis parallel to the optical axis LO. Additionally, in this case, the range of movement of the trimmed area as the imaging area is determined depending on the size of the imaging surface 14 of the image sensor 13.

Figure 18:
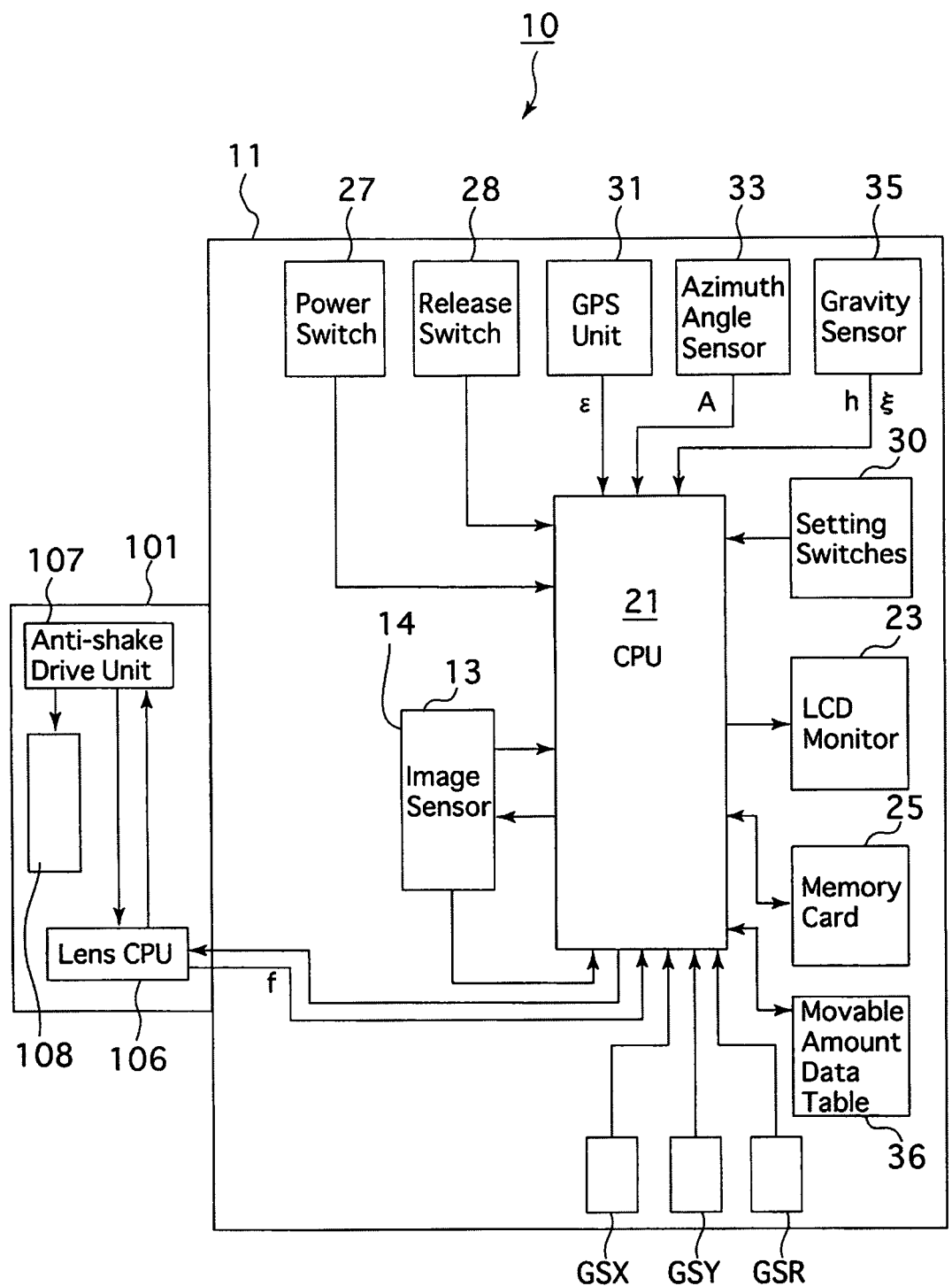
FIG. 18 is a block diagram, which corresponds to the block diagram shown in FIG. 1, illustrating main components of another embodiment of the digital camera serving as a celestial-object auto-tracking photographing apparatus according to the present invention.

Although the above described embodiment of the digital camera 10 is equipped with the image sensor drive unit 15 that linearly moves the image sensor 13 and rotates the image sensor 13 about an axis parallel to the optical axis LO, an embodiment in which a combination of an image shake corrector provided in the photographing lens 101 with an image stabilizer lens (anti-shake lens/part of photographing optical system) 108 for moving the position of an object image on the image sensor 13, and an image sensor rotating mechanism which rotates the image sensor 13 is used instead of the image sensor drive unit 15, is also possible. In addition, the above described embodiment in which the image sensor is physically rotated by the image sensor rotating mechanism can be replaced by an embodiment in which the aforementioned trimmed area is electronically rotated, for example, as shown in FIG. 18. In this embodiment, the photographing lens 101 is provided therein with a lens CPU 106 and an anti-shake drive unit 107, and the lens CPU 106 controls and drives (decenters) the image stabilizer lens 108 in directions orthogonal to the optical axis LO of the photographing lens 101 via the anti-shake drive unit 107 by sending an anti-shake drive command signal to the CPU 106 of the photographing lens 101 by the CPU 21. On the other hand, by sending a rotation command signal to the image sensor 13 by the CPU 21, the image sensor 13 is made to rotate about an axis parallel to the optical axis LO. Alternatively, by sending a trimming command signal to the image sensor 13 by the CPU 21, the trimmed area of the image sensor 13 is made to rotate about an axis parallel to the optical axis LO of the photographing lens 101. The above-mentioned term "the optical axis LO of the photographing lens 101" denotes the optical axis LO of the photographing lens 101 in an initial state before an eccentricity adjustment of the optical axis LO is carried out.

In the above illustrated embodiment, the CPU 21 calculates the theoretical linear movement amounts $\Delta x$, $\Delta y$, and the theoretical rotational angle amount $\alpha$ of the image sensor 13 (the imaging surface 14) per a specified period of time based on the focal length information f that is input from the focal length detector 105, the latitude information $\epsilon$ that is input from the GPS unit 31, the photographing azimuth angle information A that is input from the azimuth angle sensor 33, the photographing elevation angle information h, and the posture information $\xi$ that are input from the gravity sensor 35. However, the method of calculating the theoretical linear movement amounts $\Delta x$, $\Delta y$ and the theoretical rotational angle amount $\alpha$ of the image sensor 13 (the imaging surface 14) per a specified period of time is not limited to such a particular calculating method; various methods are available.

When the camera body 11 is produced, it is sometimes the case that deviations $\Delta x_0$, $\Delta y_0$ and $\alpha_0$ occur in the reference posture position of the image sensor 13 (the imaging surface 14) by adjustments made to the position of the image sensor 13 (the imaging surface 14), or the like. If such deviations occur, a precise exposure time can be calculated and set by adding the deviations $\Delta x_0$, $\Delta y_0$ and $\alpha_0$ to the theoretical linear movement amounts $\Delta x$, $\Delta y$, and the theoretical rotational angle amount $\alpha$, respectively, ($\Delta x+\Delta x_0$, $\Delta y+\Delta y_0$, $\alpha+\alpha_0$). Namely, the initial position of the image sensor 13 (the imaging surface 14) does not necessarily have to be at the reference posture position, in which the optical axis LO and the center of the image sensor (the imaging area) are coincident with each other, like the above described embodiment; the reference posture position can be determined by assigning an arbitrary value to each of $\Delta x_0$, $\Delta y_0$ and $\alpha_0$.

In this case, with the camera body 11 made to retain a shift-amount data table like that shown in FIG. 19, the CPU 21 can shift the initial position of the image sensor 13 (the imaging surface 14) on the basis of this shift-amount data table. The shift-amount data table shown in FIG. 19 corresponds to the movable-amount data table shown in FIG. 3 in which the values are located on reversed locations within the table in a "point-symmetrical" manner. The CPU 21 calculates the maximum exposure time using the shift-amount data table shown in FIG. 19 and determines theoretical linear movement amounts $\Delta x_1$, $\Delta y_1$ and the theoretical rotational angle amount $\alpha_1$ of the image sensor 13 (the imaging surface 14) when an exposure operation is performed with this maximum exposure time. In addition, by shifting the initial position of the image sensor 13 (the imaging surface 14) with $-\Delta x_1$, $-\Delta y_1$ and $-\alpha_1$ substituted for the aforementioned $\Delta x_0$, $\Delta y_0$ and $\alpha_0$, a maximum exposure time (exposure time) which is double the maximum exposure time in the case where the CPU 21 does not shift the initial position of the image sensor 13 (the imaging surface 14) is obtained.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A method of automatically tracking and photographing a celestial object, which moves relative to a photographic apparatus due to diurnal motion, while moving an imaging area on an imaging surface of an image sensor so that an image of said celestial object, which is formed on said imaging surface of said image sensor via a photographing optical system, becomes stationary relative to said imaging area of said imaging surface during a tracking and photographing operation, said method comprising:

calculating, based on information on motion of said celestial object image on said imaging area, theoretical linear movement amounts of said imaging area in directions orthogonal to an optical axis per a specified period of time and a theoretical rotational angle amount of said imaging area about an axis parallel to said optical axis per said specified period of time;

obtaining a movable-amount data table which stores data on actual linearly-movable amounts of said imaging area in said directions orthogonal to said optical axis from a reference posture position of said imaging area and an actual rotatable amount of said imaging area about said axis parallel to said optical axis from said reference posture position in a range of movement of said imaging area; and setting an exposure time for completing a celestial-object auto-tracking photographing operation while moving said imaging area within said range of movement thereof by comparing said theoretical linear movement amounts and said theoretical rotational angle amount of said imaging area per said specified period of time with said actual linearly-movable amounts and said actual rotatable amount of said imaging area that are stored in said movable-amount data table, respectively.

2. The method according to claim 1, wherein said calculating of said theoretical linear movement amounts and said theoretical rotational angle amount comprises calculating said theoretical linear movement amounts and said theoretical rotational angle amount at each step while stepwisely increasing said specified period of time, wherein said setting of said exposure time comprises:

sequentially determining whether or not said theoretical linear movement amounts and said theoretical rotational angle amount at said each step exceed said actual linearly-movable amounts and said actual rotatable amount that are stored in the movable-amount data table, respectively; and setting said exposure time to a shorter time than said specified period of time at a specific step upon determining that at least one of said theoretical linear movement amounts and said theoretical rotational angle amount at said specific step exceeds said actual linearly-movable amounts and said actual rotatable amount, which are stored in said movable-amount data table, respectively.

3. The method according to claim 2, wherein said setting of said exposure time comprises setting said specified period of time at one step before said specific step as said exposure time upon determining that at least one of said theoretical linear movement amounts and said theoretical rotational angle amount at said specific step exceeds said actual linearly-movable amounts and said actual rotatable amount which are stored in said movable-amount data table, respectively.

4. The method according to claim 1, further comprising:

shifting an initial position of said imaging area before commencement of movement thereof in accordance with said theoretical linear movement amounts and said theoretical rotational angle amount of said imaging area per said specified period of time.

5. The method according to claim 4, wherein said shifting of said initial position of said imaging area comprises shifting said initial position of said imaging area before commencement of movement thereof by linear movement amounts and a rotational angle amount in a direction opposite to a direction in the case of said theoretical linear movement amounts and said theoretical rotational angle amount of said imaging area per said specified period of time.

6. The method according to claim 1, wherein said range of movement of said imaging area in a plane orthogonal to said optical axis is virtually partitioned and arranged into a matrix with a predetermined number of rows and a predetermined number of columns so that said movable-amount data table stores an actual rotatable amount of said imaging area in each partition in said matrix.

7. A celestial-object auto-tracking photographing apparatus for automatically tracking and photographing a celestial object, which moves relative to said celestial-object auto-tracking photographing apparatus due to diurnal motion, while moving an imaging area on an imaging surface of an image sensor so that an image of said celestial object, which is formed on said imaging surface of said image sensor via a photographing optical system, becomes stationary relative to said imaging area of said imaging surface during a tracking and photographing operation, said celestial-object auto-tracking photographing apparatus comprising:

a movement data calculator which calculates, based on information on motion of said celestial object image on said imaging area, theoretical linear movement amounts of said imaging area in directions orthogonal to an optical axis per a specified period of time and a theoretical rotational angle amount of said imaging area about an axis parallel to said optical axis per said specified period of time;

a movable-amount data table which stores data on actual linearly-movable amounts of said imaging area in said directions orthogonal to said optical axis from a reference posture position of said imaging area and an actual rotatable amount of said imaging area about said axis parallel to said optical axis from said reference posture position in a range of movement of said imaging area; and an exposure time setter which sets an exposure time for completing a celestial-object auto-tracking photographing operation while moving said imaging area within said range of movement thereof by comparing said theoretical linear movement amounts and said theoretical rotational angle amount of said imaging area per said specified period of time with said actual linearly-movable amounts and said actual rotatable amount of said imaging area that are stored in said movable-amount data table.

8. The celestial-object auto-tracking photographing apparatus according to claim 7, wherein said movement data calculator calculates said theoretical linear movement amounts and said theoretical rotational angle amount at each step while stepwisely increasing said specified period of time, wherein said exposure time setter sequentially determines whether or not said theoretical linear movement amounts and said theoretical rotational angle amount at said each step exceed said actual linearly-movable amounts and said actual rotatable amount, which are stored in the movable-amount data table, respectively, and sets said exposure time to a shorter time than said specified period of time at a specific step upon determining that at least one of said theoretical linear movement amounts and said theoretical rotational angle amount at said specific step exceeds said actual linearly-movable amount and said actual rotatable amount, which are stored in said movable-amount data table, respectively.

9. The celestial-object auto-tracking photographing apparatus according to claim 8, wherein said exposure time setter sets said specified period of time at one step before said specific step as said exposure time upon determining that at least one of said theoretical linear movement amounts and said theoretical rotational angle amount at said specific step exceeds said actual linearly-movable amount and said actual rotatable amount, which are stored in said movable-amount data table, respectively.

10. The celestial-object auto-tracking apparatus according to claim 7, further comprising an imaging area shifter which shifts an initial position of said imaging area before commencement of movement thereof in accordance with said theoretical linear movement amounts and said theoretical rotational angle amount of said imaging area per said specified period of time.

11. The celestial-object auto-tracking photographing apparatus according to claim 10, wherein said imaging area shifter shifts said initial position of said imaging area before commencement of movement thereof by linear movement amounts and a rotational angle amount in a direction opposite to a direction of said theoretical linear movement amounts and said theoretical rotational angle amount of said imaging area per said specified period of time.

12. The celestial-object auto-tracking photographing apparatus according to claim 7, wherein said range of movement of said imaging area in a plane orthogonal to said optical axis is virtually partitioned and arranged into a matrix with a predetermined number of rows and a predetermined number of columns, and said movable-amount data table stores an actual rotatable amount of said imaging area in each partition in said matrix.

13. The celestial-object auto-tracking photographing apparatus according to claim 7, wherein said imaging area corresponds to an entire imaging area of said image sensor, and wherein said celestial-object auto-tracking photographing apparatus further comprises an image sensor mover which linearly moves said image sensor in said directions orthogonal to said optical axis and rotates said image sensor about said axis that is parallel to said optical axis based on said theoretical linear movement amounts and said theoretical rotational angle amount that are calculated by said movement data calculator.

14. The celestial-object auto-tracking photographing apparatus according to claim 7, wherein said imaging area corresponds to a trimmed imaging area defined by electronically trimming a part of an entire imaging area of said image sensor, and wherein said celestial-object auto-tracking photographing apparatus further comprises an imaging area mover which linearly moves said trimmed imaging area in said directions orthogonal to said optical axis and rotates said trimmed imaging area about said axis that is parallel to said optical axis based on said theoretical linear movement amounts and said theoretical rotational angle amount that are calculated by said movement data calculator.

15. The celestial-object auto-tracking photographing apparatus according to claim 7, wherein said imaging area corresponds to a trimmed imaging area defined by electronically trimming a part of an entire imaging area of said image sensor, and wherein said celestial-object auto-tracking photographing apparatus further comprises a mover which moves said celestial object image relative to said celestial-object auto-tracking photographing apparatus by decentering part of said photographing optical system and rotates said trimmed imaging area about said axis that is parallel to said optical axis based on said theoretical linear movement amounts and said theoretical rotational angle amount that are calculated by said movement data calculator.

16. The celestial-object auto-tracking photographing apparatus according to claim 7, wherein said imaging area corresponds to a trimmed imaging area defined by electronically trimming a part of an entire imaging area of said image sensor, and wherein said celestial-object auto-tracking photographing apparatus further comprises a mover which linearly moves said image sensor in said directions orthogonal to said optical axis and rotates said trimmed imaging area about said axis that is parallel to said optical axis based on said theoretical linear movement amounts and said theoretical rotational angle amount that are calculated by said movement data calculator.

\* \* \* \* \*